(12) United States Patent
Agarwala et al.

(10) Patent No.: US 11,496,830 B2
(45) Date of Patent: Nov. 8, 2022

(54) METHODS AND SYSTEMS FOR RECORDING MIXED AUDIO SIGNAL AND REPRODUCING DIRECTIONAL AUDIO

(71) Applicant: Samsung Electronics Co., Ltd., Gyeonggi-do (KR)

(72) Inventors: Naresh Kumar Agarwala, Noida (IN); Ritesh Singh, Noida (IN)

(73) Assignee: Samsung Electronics Co., Ltd.

( * ) Notice: Subject to any disclaimer, the term of this patent is extended or adjusted under 35 U.S.C. 154(b) by 98 days.

(21) Appl. No.: 17/003,495

(22) Filed: Aug. 26, 2020

(65) Prior Publication Data

US 2021/0092514 A1  Mar. 25, 2021

(30) Foreign Application Priority Data

Sep. 24, 2019 (IN) .............................. 201911038589

(51) Int. Cl.
*H04R 3/00* (2006.01)
*G06F 3/16* (2006.01)
(Continued)

(52) U.S. Cl.
CPC ............... *H04R 3/005* (2013.01); *G06F 3/16* (2013.01); *H04R 5/04* (2013.01); *H04S 7/303* (2013.01)

(58) Field of Classification Search
CPC .......... H04R 3/005; H04R 5/04; H04R 1/406; H04R 2430/23; H04S 7/303
(Continued)

(56) References Cited

U.S. PATENT DOCUMENTS 8,842,869 B2 * 9/2014 Kim ...................... H04R 1/406
381/92
8,892,433 B2 11/2014 Vitte et al.
(Continued)

FOREIGN PATENT DOCUMENTS

DK         2629551       3/2015
KR    1020090044314       5/2009
(Continued)

OTHER PUBLICATIONS

International Search Report dated Oct. 20, 2020 issued in counterpart application No. PCT/KR2020/009115, 8 pages.
(Continued)

*Primary Examiner* — Disler Paul
(74) *Attorney, Agent, or Firm* — The Farrell Law Firm, P.C.

(57) ABSTRACT

Methods and systems are provided for recording mixed audio signal and reproducing directional audio. A method includes receiving a mixed audio signal via plurality of microphones; determining an audio parameter associated with the mixed audio signal received at each of the plurality of microphones; determining active audio sources and a number of the active audio sources from the mixed audio signal; determining direction and positional information of each of the active audio source; dynamically selecting a set of microphones from the plurality of microphones based on at least one of the number of the active audio sources, the direction of each of the active audio sources, the positional information of each of the active audio sources, the audio parameter, or a predefined condition; and recording, based on the selected set of microphones, the mixed audio signal for reproducing directional audio.

16 Claims, 22 Drawing Sheets

(51) Int. Cl.
*H04S 7/00* (2006.01)
*H04R 5/04* (2006.01)

(58) Field of Classification Search
USPC ................................................ 381/91–92, 26
See application file for complete search history.

(56) References Cited

U.S. PATENT DOCUMENTS

| | | | |
|---|---|---|---|
| 9,197,974 B1 | 11/2015 | Clark et al. | |
| 9,489,948 B1 | 11/2016 | Chu et al. | |
| 10,229,697 B2* | 3/2019 | Bastyr | G10L 21/0208 |
| 10,291,986 B1* | 5/2019 | Plitkins | H04R 5/04 |
| 2005/0147258 A1* | 7/2005 | Myllyla | H01Q 3/2611 |
| | | | 381/94.2 |
| 2007/0223731 A1 | 9/2007 | Togami et al. | |
| 2012/0207323 A1 | 8/2012 | Kim | |
| 2012/0237055 A1 | 9/2012 | Groh | |
| 2014/0341547 A1* | 11/2014 | Shenoy | H04R 1/406 |
| | | | 386/285 |
| 2014/0362253 A1 | 12/2014 | Kim et al. | |
| 2015/0078555 A1* | 3/2015 | Zhang | H04R 5/027 |
| | | | 381/26 |
| 2016/0163329 A1* | 6/2016 | Son | G10L 15/26 |
| | | | 381/92 |
| 2017/0206900 A1 | 7/2017 | Lee et al. | |
| 2017/0243578 A1 | 8/2017 | Son et al. | |
| 2018/0166091 A1 | 6/2018 | Son et al. | |
| 2018/0213326 A1 | 7/2018 | Huttunen et al. | |

FOREIGN PATENT DOCUMENTS

| | | |
|---|---|---|
| KR | 1020170087207 | 8/2017 |
| KR | 1020170097519 | 8/2017 |
| WO | WO 2012-072798 | 6/2012 |

OTHER PUBLICATIONS

Indian Examination Report dated Sep. 24, 2021 issued in counterpart application No. 201911038589, 5 pages.
European Search Report dated Jun. 13, 2022 issued in counterpart application No. 20869078.4-1210, 10 pages.

* cited by examiner

METHODS AND SYSTEMS FOR RECORDING MIXED AUDIO SIGNAL AND REPRODUCING DIRECTIONAL AUDIO

CROSS-REFERENCE TO RELATED APPLICATION(S)

This application is based on and claims priority under 35 U.S.C. § 119(a) to Indian Patent Application Serial No. 201911038589 (CS), which was filed in the Indian Intellectual Property Office on Sep. 24, 2019, the entire disclosure of which is incorporated herein by reference.

BACKGROUND

1. Field

The disclosure generally relates generally to processing a mixed audio signal, and more particularly, to methods and systems for recording a mixed audio signal and reproducing directional audio.

2. Description of Related Art

Separating individual audio source signals from a mixed audio signal received by a device having a plurality of microphones without any visual information is known as the blind source separation. In real world, the number of audio sources can vary dynamically. As such, blind source separation is a challenging problem and is more problematic for under-determined cases and over-determined cases.

Most blind source separation solutions require the microphones to be well-separated from each other and the number of microphones to be equal to be number of sources. However, blind source separation solutions often do not give very good results or in some cases fail completely, which leads to an inability to reproduce optimum quality directional or separated audio signals, thereby resulting in a poor user-experience.

Algorithms such as beam-forming and independent vector analysis (IVA) provide optimum separation for determined cases. However, in relation to over-determined cases, these algorithms do not provide efficient results as these algorithms need invertibility through the use of a mixing matrix, thereby leading to poor audio separation. In addition, a lot of processing and time are involved to find the active audio sources when the number of sources is not equal to the number of microphones.

To address these problems, some solutions utilize dynamic microphone allocation or selection based on a number of audio sources simultaneously transmitting audio signals. For example, these solutions include separation of the mixed audio signal into frequency components and treating each component separately. However, these solutions require a lot of processing if the number of microphones is greater than number of audio sources, and are time consuming.

Selection is based on wide spacing between microphones for low frequency or narrow spacing between microphones for high frequency. In a realistic scenario, sound is distributed across a large frequency range. However, only taking separation between microphones into account does not lead to effective selection. In addition, these solutions do not take into account the different distributions of the microphones and other parameters of the mixed audio signal.

In another solution, power of a noise component is considered as a cost function in addition to an l1 norm used as a cost function when the l1 norm minimization method separates sounds. In the l1 norm minimization method, a cost function is defined assuming that voice has no relation to a time direction. However, in the solution, a cost function is defined assuming that voice has a relation to a time direction, and because of its construction, a solution having a relation to a time direction is easily selected. Accordingly, an analog/digital (A/D) converting unit converts an analog signal from a microphone array including at least two microphone elements or more into a digital signal. A band splitting unit band splits the digital signal. An error minimum solution calculating unit, for each of the bands, from among vectors in which audio sources exceeding the number of microphone elements have the value zero, for each of vectors that have the value zero in same elements, outputs such a solution that an error between an estimated signal calculated from the vector and a steering vector registered in advance and an input signal is at a minimum. An optimum model calculation part, for each of the bands, from among error minimum solutions in a group of audio sources having the value zero, selects such a solution that a weighted sum of an lp norm value and the error is at a minimum. A signal synthesizing unit converts the selected solution into a time area signal, which allows for separation of each audio source with high signal/noise (S/N), even in an environment in which the number of audio sources exceeds the number of microphones and some background noises, echoes, and reverberations occur. However, this solution is optimum for under-determined cases but not for over-determined cases.

In another solution, one microphone is selected from two or more microphones, for a speech processor system such as a "hands-free" telephone device operating in a noisy environment. Accordingly, sound signals picked up simultaneously by two microphones (N, M) are digitized. A short-term Fourier transform is performed on the signals (xn(t), xm(t)) picked up on the two channels in order to produce a succession of frames in a series of frequency bands. An algorithm is applied for calculating a speech-presence confidence index on each channel, i.e., a probability that speech is present. One of the two microphones is selected by applying a decision rule to the successive frames of each of the channels. The decision rule is a function of both a channel selection criterion and a speech-presence confidence index. Speech processing is implemented on the sound signal picked up by the one microphone that is selected. However, this solution is not optimum for over-determined cases.

In another solution, an augmented reality environment allows for interaction between virtual and real objects. Multiple microphone arrays of different physical sizes are used to acquire signals for spatial tracking of one or more audio sources within the environment. A first array with a larger size may be used to track an object beyond a threshold distance, while a second array having a size smaller than the first may be used to track the object up to the threshold distance. By selecting different sized arrays, accuracy of the spatial location is improved. Thus, this solution provides noise cancellation and good spatial resolution and sound source tracking in case of moving sources. However, this solution is based on a distance of the sources and is therefore not optimum for over-determined cases.

Thus, a need still exists for a solution to the above-described problems.

SUMMARY

An aspect of the disclosure is to provide methods and systems for recording mixed audio signal and reproducing directional audio In accordance with an aspect of the disclosure, a method is provided for recording a mixed audio signal to reproduce directional audio. The method includes receiving a mixed audio signal via plurality of microphones; determining an audio parameter associated with the mixed audio signal received at each of the plurality of microphones; determining active audio sources and a number of the active audio sources from the mixed audio signal; determining direction and positional information of each of the active audio source; dynamically selecting a set of microphones from the plurality of microphones based on at least one of the number of active audio sources, the direction of each of the active audio sources, the positional information of each of the active audio sources, the audio parameter, and/or a predefined condition; and recording, based on the selected set of microphones, the mixed audio signal for reproducing directional audio.

In accordance with another aspect of the disclosure, a system is provided for recording a mixed audio signal to reproduce directional audio. The system includes a memory; and a processor configured to receive a mixed audio signal via a plurality of microphones, determine an audio parameter associated with the mixed audio signal received at each of the plurality of microphones, determine active audio sources and a number of the active audio sources from the mixed audio signal, determine direction and positional information of each of the active audio source, dynamically select a set of microphones from the plurality of microphones based on at least one of the number of active audio sources, the direction of each of the active audio sources, the positional information of each of the active audio sources, the audio parameter, and/or a predefined condition, and record, based on the selected set of microphones, the mixed audio signal for reproducing directional audio.

In accordance with another aspect of the disclosure, a method is provided for reproducing directional audio from a recorded mixed audio signal. The method includes receiving a user input to play an audio file including the recorded mixed audio signal and a first type of information pertaining to the mixed audio signal and a second type of information pertaining to a set of microphones selected for recording the mixed audio signal; obtaining a plurality of audio signals corresponding to active audio sources in the mixed audio signal based on the first type of information; and reproducing the plurality of audio signals from one or more speakers based on at least one of the first type of information and the second type of information.

BRIEF DESCRIPTION OF THE DRAWINGS

The above and other features, aspects, and advantages of certain embodiments of the disclosure will become will be more apparent from the following detailed description taken in conjunction with the accompanying drawings, in which:

FIGS. 2. 15A and 15B illustrate operations for recording a mixed audio signal and reproducing directional audio therefrom, according to an embodiment;

DETAILED DESCRIPTION

Figure 1:
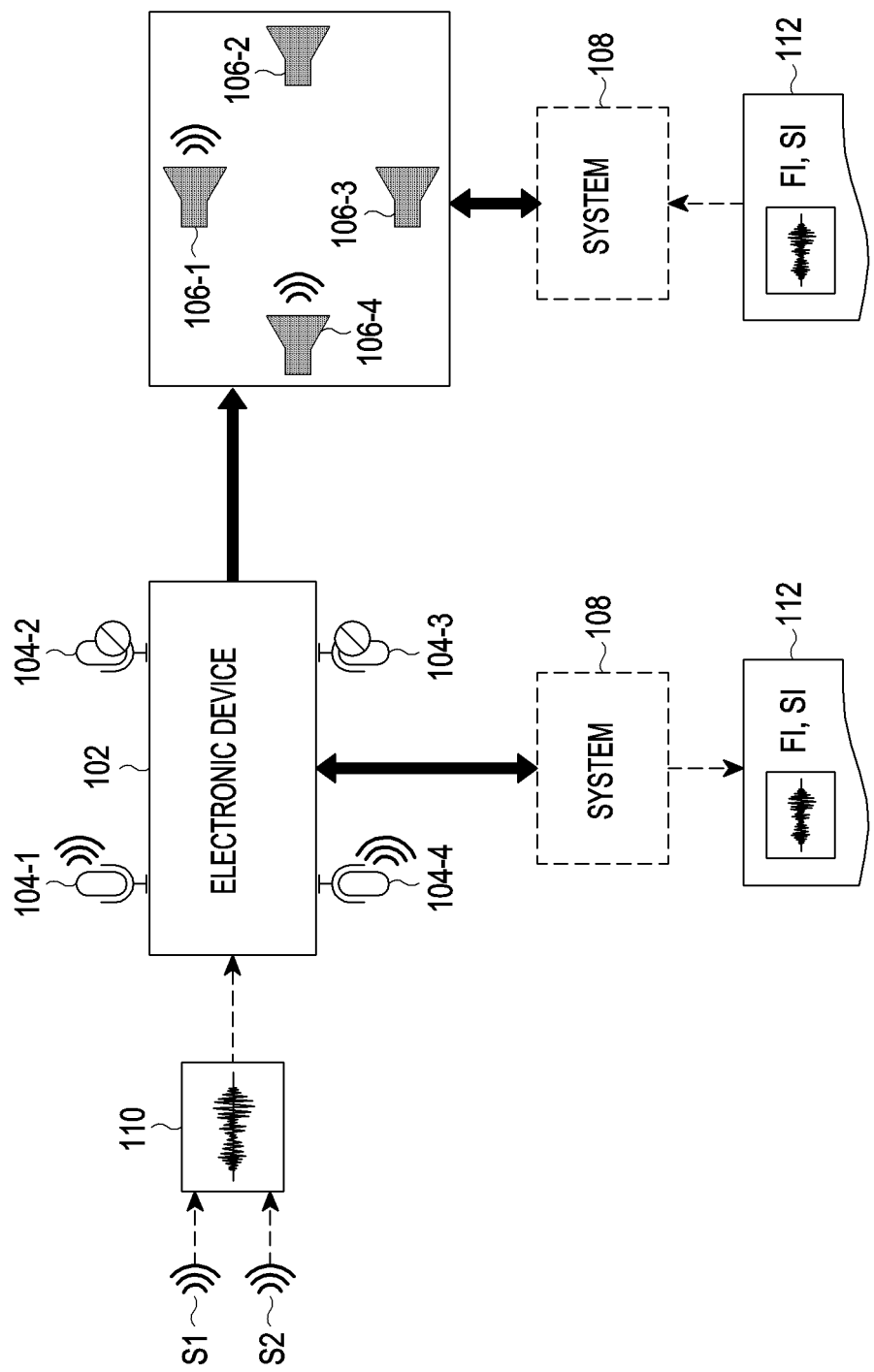
FIG. 1 illustrates an interaction between an electronic device, a plurality of microphones, and a plurality of speakers, for recording a mixed audio signal and reproducing directional audio therefrom, according to an embodiment.

Various embodiments of the disclosure will be described in detail below with reference to the accompanying drawings. In the following description, specific details such as detailed configuration and components are merely provided to assist the overall understanding of these embodiments. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

Further, skilled artisans will appreciate that elements in the drawings are illustrated for simplicity and may not have necessarily been drawn to scale. For example, the flow charts illustrate methods in terms of the most prominent steps involved to help to improve understanding of certain aspects of the disclosure. In terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

FIG. 1 illustrates an interaction between an electronic device, a plurality of microphones, and a plurality of speakers, according to an embodiment.

Referring to FIG. 1, an electronic device 102 includes audio processing functionality. For example, the electronic device 102 may be a mobile device, such as a smart phone, a tablet, a tab-phone, or a personal digital assistance (PDA), a conference phone, a 360-degree view recorder, and a head mounted virtual reality device. A plurality of microphones 104-1, 104-2, 104-3, and 104-4 are integrated in the electronic device 102. Although FIG. 1 illustrates only four microphones 104-1, 104-2, 104-3, and 104-4, the disclosure is not limited thereto. Alternatively, the plurality of microphones 104-1, 104-2, 104-3, and 104-4 can be configured to be communicatively coupled with the electronic device 102 over a network, e.g., a wired network or a wireless network. Examples of the wireless network include a cloud based network, a Wi-Fi® network, a WiMAX® network, a local area network (LAN), a wireless LAN (WLAN), a Bluetooth™ network, a near field communication (NFC) network, etc.

Speakers 106-1, 106-2, 106-3, and 106-4 may be earphone speakers, headphone speakers, standalone speakers, mobile speakers, loudspeakers, etc. Alternatively, one or more of the plurality of speakers 106-1, 106-2, 106-3, and 106-4 can be integrated as part of the electronic device 102. For example, the electronic device 102 can be a smartphone with an integrated speaker.

One or more of the plurality of speakers 106-1, 106-2, 106-3, and 106-4 can be standalone speakers, e.g., smart speakers, and can be configured to communicatively couple with the electronic device 102 over the network. For example, the electronic device 102 can be a smartphone connected with ear-phones or headphones.

The plurality of speakers 106-1, 106-2, 106-3, and 106-4 can be located in various corners of a room and may be connected with a smartphone in a smart home network.

Alternatively, the plurality of speakers 106-1, 106-2, 106-3, and 106-4 can be integrated into a further electronic device. The further electronic device may or may not include the plurality of microphones 104-1, 104-2, 104-3, and 104-4.

Although FIG. 1 illustrates only four speakers 106-1, 106-2, 106-3, and 106-4, the disclosure is not limited thereto.

A system 108 is provided for recording a mixed audio signal and reproducing directional audio from the recorded mixed audio signal. The system 108 may be implemented in at least one of the electronic device 102, the plurality of speakers 106-1, 106-2, 106-3, and 106-4, and the further device, and therefore, is illustrated with dashed lines.

The system 108 receives a mixed audio signal 110 in a real world environment at the plurality of microphones 104-1, 104-2, 104-3, and 104-4. The system 108 determines at least one audio parameter associated with the mixed audio signal 110 received at each of the plurality of microphones 104-1, 104-2, 104-3, and 104-4. The system 108 determines active audio sources, e.g., source S1 and source S2, and a total number of the active audio sources, e.g., two, from the mixed audio signal 110. The system 108 determines direction and positional information of each of the active audio sources. The system 108 dynamically selects a set of microphones from the plurality of microphones 104-1, 104-2, 104-3, and 104-4 based on the number of active audio sources, the direction of each of the active audio sources, the positional information of each of the active audio sources, the at least one audio parameter, and at least one predefined condition. The at least one predefined condition allows for selection of microphones based on the number of active audio sources and will be described in more detail below.

The system 108 records the mixed audio signal 110 in accordance with the selected set of microphones for reproducing directional audio from the recorded mixed audio signal. The system 108 stores the recorded mixed audio signal in conjunction with a first type of information (FI) pertaining to the mixed audio signal and a second type of information, (SI), pertaining to the selected set of microphones as an audio file 112. In FIG. 1, two active audio sources, S1 and S2, are detected from the mixed audio signal 110. Accordingly, the set of microphones are dynamically selected to include two (2) microphones, e.g., 104-1 and 104-4, from the plurality of microphones 104-1, 104-2, 104-3, and 104-4. The system 108 records the mixed audio signal 110 through the set of microphones 104-1 and 104-4, while the remaining microphones 104-2 and 104-3 may be deactivated to save power, to reduce load, and/or to reduce use of space or may be used for noise suppression. The system 108 stores the recorded mixed audio signal as the audio file 112.

The system 108 may receive a user input to play the audio file 112 including the mixed audio signal in conjunction with the FI pertaining to the mixed audio signal and the SI pertaining to the set of microphones selected for recording the mixed audio signal. The system 108 performs source separation to obtain a plurality of audio signals corresponding to the active audio sources, i.e., source S1 and source S2, in the mixed audio signal based on the first type of information. The system 108 reproduces the plurality of audio signals from one or more of the speakers 106-1, 106-2, 106-3, and 106-4 based on at least one of the first type of information and the second type of information.

In FIG. 1, the system 108 receives a user input to play the audio file 112. The system 108 performs source separation to obtain audio signals corresponding to the two active audio sources S1 and S2 based on the first type of information. The system 108 reproduces the audio signals of both the active audio sources S1 and S2 through two speakers 106-1 and 106-4 as directional audio, based on at least one of the FI and/or the SI. Although FIG. 1 illustrates reproduction of the audio signals from speakers 106-1 and 106-4, the audio signals can be reproduced from one speaker as well.

Figure 2:
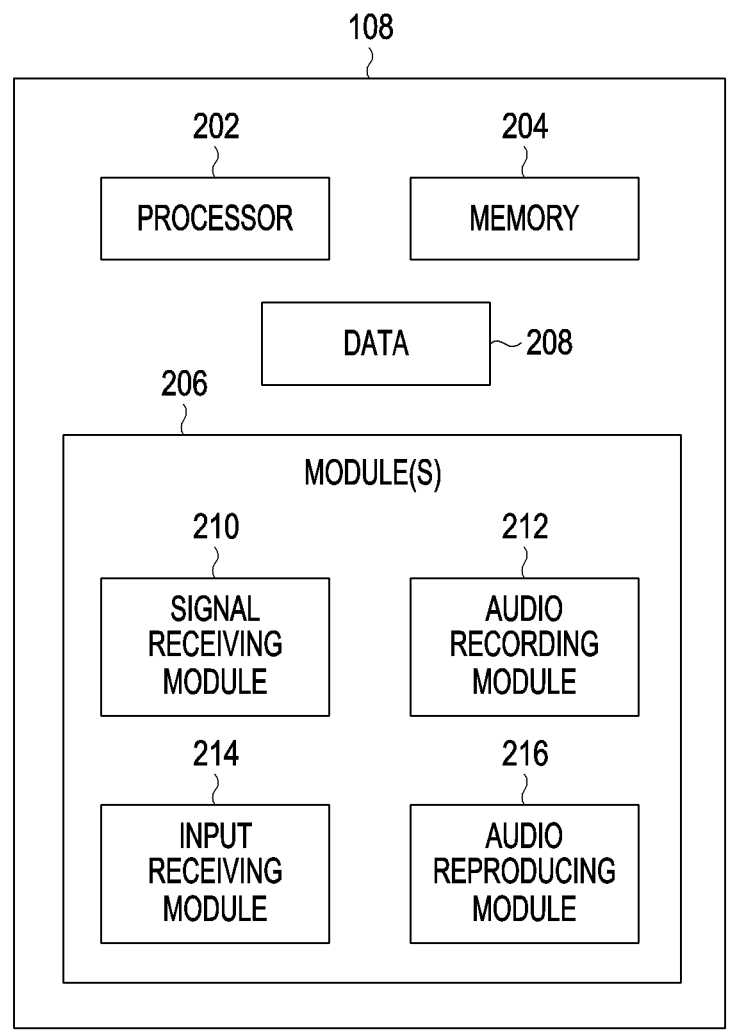
FIG. 2 illustrates a system for recording a mixed audio signal and reproducing directional audio therefrom, according to an embodiment.

FIG. 2 illustrates a system for recording a mixed audio signal and reproducing directional audio from the recorded mixed audio signal, according to an embodiment.

Referring to FIG. 2, the system/apparatus 108 includes a processor 202, a memory 204, module(s) 206, and data 208. The processor 202, the memory 204, and the module(s) 206 are communicatively coupled with each other, e.g., via a bus.

The data 208 may serve as a repository for storing data processed, received, and/or generated by the module(s) 206.

The processor 202 may be a single processing unit or a number of units, all of which could include multiple computing units. The processor 202 may be implemented as one or more microprocessors, microcomputers, microcontrollers, digital signal processors, central processing units, processor cores, multi-core processors, multiprocessors state machines, logic circuitries, application-specific integrated circuits, field programmable gate arrays, artificial intelligence (AI) cores, graphic processing units, and/or any devices that manipulate signals based on operational instructions. The processor 202 may be configured to fetch and/or execute computer-readable instructions and/or data, e.g., the data 208, stored in the memory 204.

The memory 204 includes any non-transitory computer-readable medium known in the art including volatile memory, such as static random access memory (SRAM) and/or dynamic random access memory (DRAM), and/or non-volatile memory, such as read-only memory (ROM), erasable programmable ROM, flash memories, hard disks, optical disks, and magnetic tapes.

The module(s) 206 may include routines, programs, objects, components, data structures, etc., which perform particular tasks or implement data types. The module(s) 206 may also be implemented as, signal processor(s), state machine(s), logic circuitries, and/or any other device or component that manipulate signals based on operational instructions.

The module(s) 206 may be implemented in hardware, software, instructions executed by at least one processing unit, or by a combination thereof. The processing unit may include a computer, a processor, e.g., the processor 202, a state machine, a logic array and/or any other suitable devices capable of processing instructions. The processing unit may be a general-purpose processor which executes instructions to cause the general-purpose processor to perform operations, or the processing unit may be dedicated to performing certain functions. The module(s) 206 may be machine-readable instructions (software) which, when executed by a processor/processing unit, perform any of the described functionalities.

The module(s) 206 include a signal receiving module 210, an audio recording module 212, an input receiving module 214, and an audio reproducing module 216, which may be in communication with each other.

Figure 3:
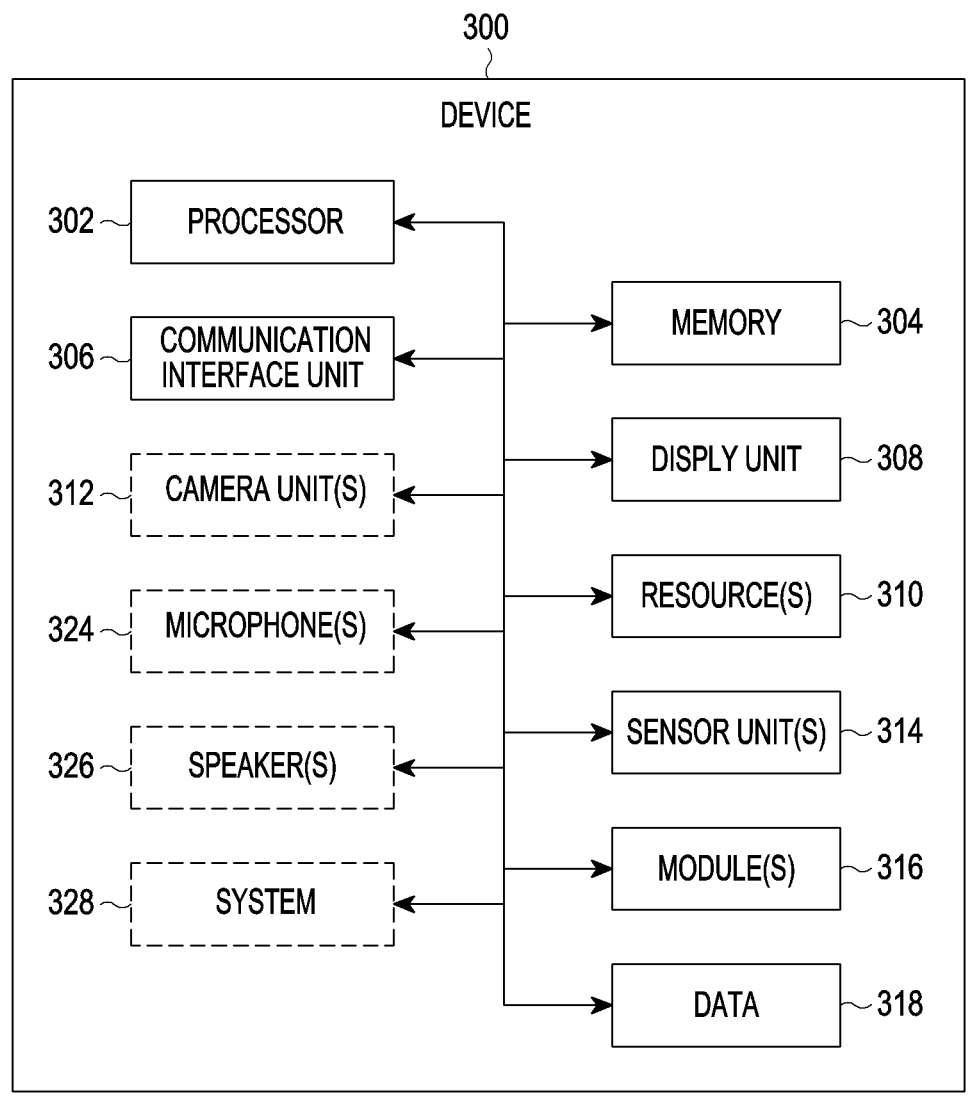
FIG. 3 illustrates a device for recording a mixed audio signal and reproducing directional audio therefrom, according to an embodiment.

FIG. 3 illustrates a device for recording a mixed audio signal and reproducing directional audio from the recorded mixed audio signal, according to an embodiment.

The device 300 includes a processor 302, a memory 304, a communication interface unit 306, a display unit 308, resource(s) 310, camera unit(s) 312, sensor unit(s) 314, module(s) 316, and data 318. Similar to the electronic device 102 illustrated in FIG. 1, the device 300 may also include a plurality of microphones 324, a plurality of speakers 326, and/or a system 328 (e.g., the system 108). The processor 302, the memory 304, the communication interface unit 306, the display unit 308, the resource(s) 310, the sensor unit(s) 314, the module(s) 316 and/or the system 328 may be communicatively coupled with each other via a bus. The device 300 may also include one or more input devices, such as a microphone, a stylus, a number pad, a keyboard, a cursor control device, such as a mouse, and/or a joystick, etc., and/or any other device operative to interact with the device 300. The device 300 may also include one or more output devices, such as headphones, earphones, and virtual audio devices.

The data 318 may serve as a repository for storing data processed, received, and/or generated (e.g., by the module(s) 316).

The device 300 can record the mixed audio signal with dynamically selected microphones, save the mixed audio thus recorded, and/or reproduce the directional audio. Therefore, the device 300 may include includes the plurality of microphones 324, the plurality of speakers 326, and the system 328. As such, the module(s) 316 may include the signal receiving module 210, the audio recording module 212, the input receiving module 214, and the audio reproducing module 216, as illustrated in FIG. 2.

The device 300 can record the mixed audio signal with dynamically selected microphones and save the recorded mixed audio. Therefore, the device 300 may include the plurality of microphones 324 and the system 328, but may not include the speakers 326. As such, the module(s) 316 includes the signal receiving module 210, the audio recording module 212, and the input receiving module 214, but may not include the audio reproducing module. 216.

The device 300 may include the plurality of speakers 326 and the system 328, but may not include the microphones 324. As such, the module(s) 316 include the input receiving module 214 and the audio reproducing module 216, but may not include the signal receiving module 210 and the audio recording module 212.

The processor 302 may be a single processing unit or a number of units, all of which may include multiple computing units. The processor 302 may be implemented as one or more microprocessors, microcomputers, microcontrollers, digital signal processors, central processing units, processor cores, multi-core processors, multiprocessors, state machines, logic circuitries, application-specific integrated circuits, field programmable gate arrays, AI cores, graphical processing units, and/or any devices that manipulate signals based on operational instructions. The processor 302 may be configured to fetch and/or execute computer-readable instructions and/or data (e.g., the data 318) stored in the memory 304. The processor 202 of the system 108 may be integrated with the processor 302 of the device 300 during manufacturing of the device 300.

The memory 304 may include a non-transitory computer-readable medium known in the art including, e.g., volatile memory, such as SRAM and/or DRAM, and/or non-volatile memory, such as ROM, erasable programmable ROM (EPROM), flash memory, hard disks, optical disks, and/or magnetic tapes. The memory 204 of the system 108 may be integrated with the memory 304 of the device 300 during manufacturing of the device 300.

The communication interface unit 306 may facilitate communication by the device 300 with other electronic devices (e.g., another device including speakers).

The display unit 308 may display various types of information (e.g., media contents, multimedia data, text data, etc.) to a user of the device 300. The display unit 308 may display information in a virtual reality (VR) format, an augmented reality (AR) format, and 360-degree view format. The display unit 308 may include a liquid crystal display (LCD), a light emitting diode (LED) display, an organic LED (OLED) display, a plasma cell display, an electronic ink array display, an electronic paper display, a flexible LCD, a flexible electro-chromic display, and/or a flexible electro wetting display. The system 328 may be integrated with the display unit 308 of the device 300 during manufacturing of the device 300.

The resource(s) 310 may be physical and/or virtual components of the device 300 that provide inherent capabilities and/or contribute towards the performance of the device 300. The resource(s) 310 may include memory (e.g., the memory 304), a power unit (e.g., a battery), a display unit (e.g., the VR enabled display unit 308), etc. The resource(s) 310 may include a power unit/battery unit, a network unit (e.g., the communication interface unit 306), etc., in addition to the processor 302, the memory 304, and the VR enabled display unit 308.

The device 300 may be an electronic device with audio-video recording capability, e.g., like the electronic device 102. The camera unit(s) 312 may be an integral part of the device 300 or may be externally connected with the device 300, and therefore, are illustrated with dashed lines. Examples of the camera unit(s) 312 include a three dimensional (3D) camera, a 360-degree camera, a stereoscopic camera, a depth camera, etc.

The device 300 may be a standalone device, such as the speaker 326. Therefore, device 300 may not include the camera unit(s) 312.

The sensor unit(s) 314 may include an eye-tracking sensor, a facial expression sensor, an accelerometer, a magnetometer, a gyroscope, a location sensor, a gesture sensor, a grip sensor, a biometric sensor, an audio module, location detection sensor, position detection sensor, depth sensor, etc.

The module(s) 316 include routines, programs, objects, components, data structures, etc., which perform particular tasks or implement data types. The module(s) 316 may also be implemented as, signal processor(s), state machine(s), logic circuitries, and/or any other device and/or component that manipulate signals based on operational instructions.

Further, the module(s) 316 may be implemented in hardware, software, instructions executed by a processing unit, or by a combination thereof. The processing unit may comprise a computer, a processor, such as the processor 302, a state machine, a logic array and/or any other suitable devices capable of processing instructions. The processing unit may be a general-purpose processor which executes instructions that cause the general-purpose processor to perform operations, or the processing unit may be dedicated to performing certain functions. The module(s) 316 may be machine-readable instructions (software) which, when executed by a processor/processing unit, may perform any of the described functionalities.

The module(s) 316 may include the system 328. The system 328 may be implemented as part of the processor 302. The system 328 may be external to both the processor 302 and the module(s) 316. Operations described herein as being performed by any or all of the electronic device 102, the speakers 106, the system 328, at least one processor (e.g., the processor 302 and/or the processor 202), and any of the module(s) 206 may be performed by any other hardware, software or a combination thereof.

Referring to FIGS. 1-3, the signal receiving module 210 receives the mixed audio signal 110 at the plurality of microphones 104-1, 104-2, 104-3, and 104-4 in the real world environment. Examples of the real world environment include a home, various rooms in a home, a vehicle, an office, a theatre, a museum, other buildings, open spaces, parks, bird sanctuaries, public places, etc. A mixed audio signal is formed when two or more audio signals, with or without a video signal, are received simultaneously in the real world environment. For example, in a conference room, the mixed audio signal can be multiple voices of different human speakers simultaneously speaking to a conference phone from one end. In such an example, a user of the electronic device 102 may place the electronic device 102 near the conference phone at another end to receive the mixed audio signal from the conference phone.

As another example, in a public picnic place, the mixed audio signal can be video of the public picnic place including sounds of a bird and sounds of a waterfall in the public picnic place. A user of the electronic device 102 may record the mixed audio signal on the electronic device 102.

Upon receiving the mixed audio signal, the audio recording module 212 determines at least one audio parameter associated with the mixed audio signal 110 received at each of the plurality of microphones 104-1, 104-2, 104-3, and 104-4. The at least one audio parameter includes dominant wavelength, intensity, amplitude, dominant frequency, pitch, and loudness. The at least one audio parameter can be determined using techniques as known in the art.

The audio recording module 212 determines active audio sources and a total number of the active audio sources from the mixed audio signal. Examples of the active audio sources include media players with integrated speakers, standalone speakers, human speakers, non-human speakers such as birds, animals, etc., natural audio sources such as waterfalls, etc., and any electronic device with integrated speakers. In some examples, the active audio sources can be static or fixed, e.g., natural audio sources, human speakers sitting in a room, etc. The active audio sources can be dynamic or moving, e.g., birds, human speakers in a room or a public place, etc. In the above examples, the active audio sources are human speakers, bird, and waterfall.

The type of active audio sources and the number of active audio sources can be determined using techniques as known in the art, such as a Pearson cross-correlation technique, a super gaussian mixture model, an i-vector technique, voice activity detection (VAD), and neural networks such as, universal background model—Gaussian mixture model (UBM-GMM) based speaker recognition, i-vectors extraction based speaker recognition, linear discriminant analysis/support vector discriminant analysis (LDA/SVDA) based speaker recognition, probabilistic linear discriminant analysis (PLDA) based speaker recognition, etc.

The audio recording module 212 may also perform gender classification upon determining the active audio sources, e.g., using techniques or standards as known in the art such as Mel frequency cepstral coefficient (MFCC), pitch based gender recognition, neural networks, etc.

Referring again to the example in FIG. 1, upon determining the active audio sources as source S1 and source S2, and the number of active audio sources as two (2), the audio recording module 212 performs further processing of the mixed audio signal 110 only if the number of active audio sources is at least two (2) and is less than a number of the plurality of microphones 104. Such a criteria indicates an over-determined case and is pre-stored in the memory 304 or the memory 204 during manufacturing of the electronic device 102 or while performing a system update on the electronic device 102. The further processing includes various operations such as direction estimation or determination, positional information detection, dynamic microphone selection, and recording audio signal based on the dynamic microphone selection, estimated direction, estimated positional information, etc. Such further processing is also possible when the number of active audio sources is one (1). However, the same shall not be construed as limiting to the disclosure.

Upon determining the number of active audio sources is at least two (2), the audio recording module 212 determines direction and positional information of each of the active audio source. The positional information includes one or more of location/position of the active audio source, distance of the active audio source from the electronic device 102 and/or camera unit(s) 312, and/or depth information related to the active audio source. The positional information of the active audio sources can be determined using techniques as known in the art. The positional information of each of the active audio sources may be determined from the mixed audio signal 110 using techniques as known in the art. The positional information of each of the active audio sources may be determined from media including the mixed audio signal 110 using techniques as known in the art. The media can be video recording of the real world environment having the active audio sources on the electronic device 102 using the camera unit(s) 312.

The direction of each of the active audio sources may be determined relative to the plurality of microphones 104, may be determined relative to a direction of the electronic device 102, may be determined relative to a direction of the camera unit(s) 312 of the electronic device 102, or may be determined relative to a direction of a ground surface. The direction of the active audio sources may be determined with respect to a binaural axis of the plurality of microphones 104-1, 104-2, 104-3, and 104-4 and/or the electronic device 102. Therefore, the direction or orientation of the active audio sources can be absolute or relative and can change with respect to movement of the active audio source itself. The direction or the orientation of the active audio source can include one or more of azimuthal direction or angle and elevation direction or angle. The audio recording module 212 may determine the direction of each of the active audio sources based on at least one of the at least one audio parameter, a magnetometer reading of the electronic device 102, an azimuthal direction of the active audio source, and/or an elevation direction of the active audio source.

The audio recording module 212 may determine the direction of each of the active audio sources using any known technique such as band pass filtering and a Pearson Cross-correlation technique, a multiple signal classification (MUSIC) algorithm, a generalized cross correlation (GCC)—phase transformation (PHAT) algorithm, etc. As such, the audio recording module 212 may determine a dominant wavelength of the received mixed audio signal 110.

Microphones 104-1, 104-2, 104-3, and 104-4 should be well-separated from each other for better source separation. Typically, well-separated microphones indicate the distance between the microphones should be closer to half of the wavelength which is contributing significant energy/intensity at any of the microphones. Accordingly, the audio recording module 212 may identify microphone which has received the highest energy/intensity from the audio parameters determined for each of the plurality of microphones 104-1, 104-2, 104-3, and 104-4. The audio recording module 212 then applies Fourier transformation to the mixed audio signal 110 and measures energy of each frequency component in the mixed audio signal 110. Based on the measured energy, the audio recording module 212 identifies dominant frequency which contains the highest energy. The audio recording module 212 then calculates wavelength of the dominant frequency as the dominant wavelength of the mixed audio signal.

Upon determining the dominant wavelength, the audio recording module 212 determines a pair of microphones from the plurality of microphones 104-1, 104-2, 104-3, and 104-4 with a distance substantially equal to half of the dominant wavelength. The audio recording module 212 creates pairs of microphones from the plurality of microphones 104-1, 104-2, 104-3, and 104-4. The audio recording module 212 then calculates a distance between microphones in each pair and selects the pair having a distance substantially equal or closest to half of the dominant wavelength.

Thereafter, the audio recording module 212 filters the mixed audio signal 110 in the selected pair of microphones by applying a filter, such as band pass filter, etc. Such filtering allows the audio recording module 212 to select a narrow beam-width around the dominant wavelength. The audio recording module 212 generates a Pearson cross-correlation array using the filtered microphone signals. The peaks in the cross-correlation array indicate the active audio sources and location of the peaks indicate the orientation or direction of the active audio sources. Accordingly, the audio recording module 212 may determine the direction of the active audio sources.

Alternatively, the input receiving module 214 receives a user input indicative of selection of each of the active audio sources in media including the mixed audio signal 110. The media can be live video recording of the real world environment having the active audio sources on the electronic device 102 using the camera unit(s) 312. The user input can be touch-input or non-touch input on the electronic device 102. The media can be live video recording of human speakers in a conference on the electronic device 102 using the camera unit(s) 312. The user input can be received individually for each user. In an example, the user input can be received for all users. The audio recording module 212 identifies the active audio sources in the media in response to the user input. The audio recording module 212 identifies the active audio sources using techniques as known in the art, e.g., stereo vision, face localization, face recognition, VAD, UBM-GMM based speaker recognition, i-vectors extraction based speaker recognition, LDA/SVDA based speaker recognition, PLDA based speaker recognition, etc. The audio recording module 212 determines the direction of each of the active audio sources based on an analysis of the media. The audio recording module 212 may analyze the media using image sensor geometry and focal length specifications, i.e., an angle between the audio source and the camera unit(s) 312, to determine the direction or the azimuthal and elevation angles of active audio sources in the media.

Figure 4A:
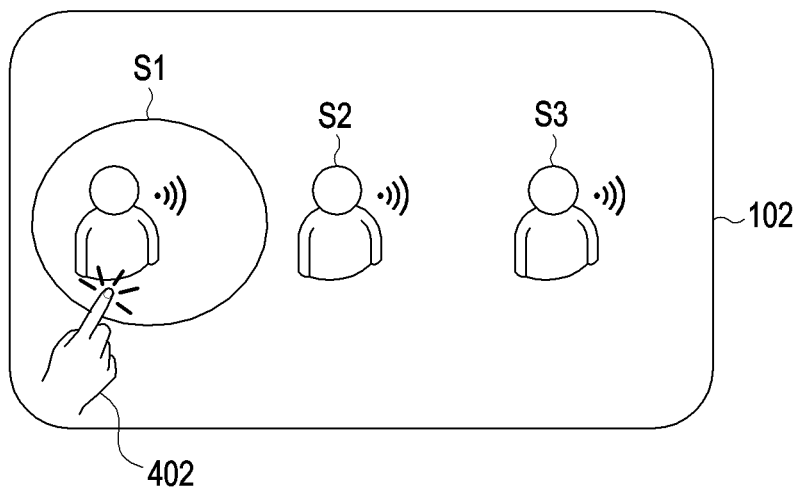
FIGS. 4A and 4B illustrate operations for recording a mixed audio signal and reproducing directional audio therefrom, according to an embodiment.
Figure 4B:
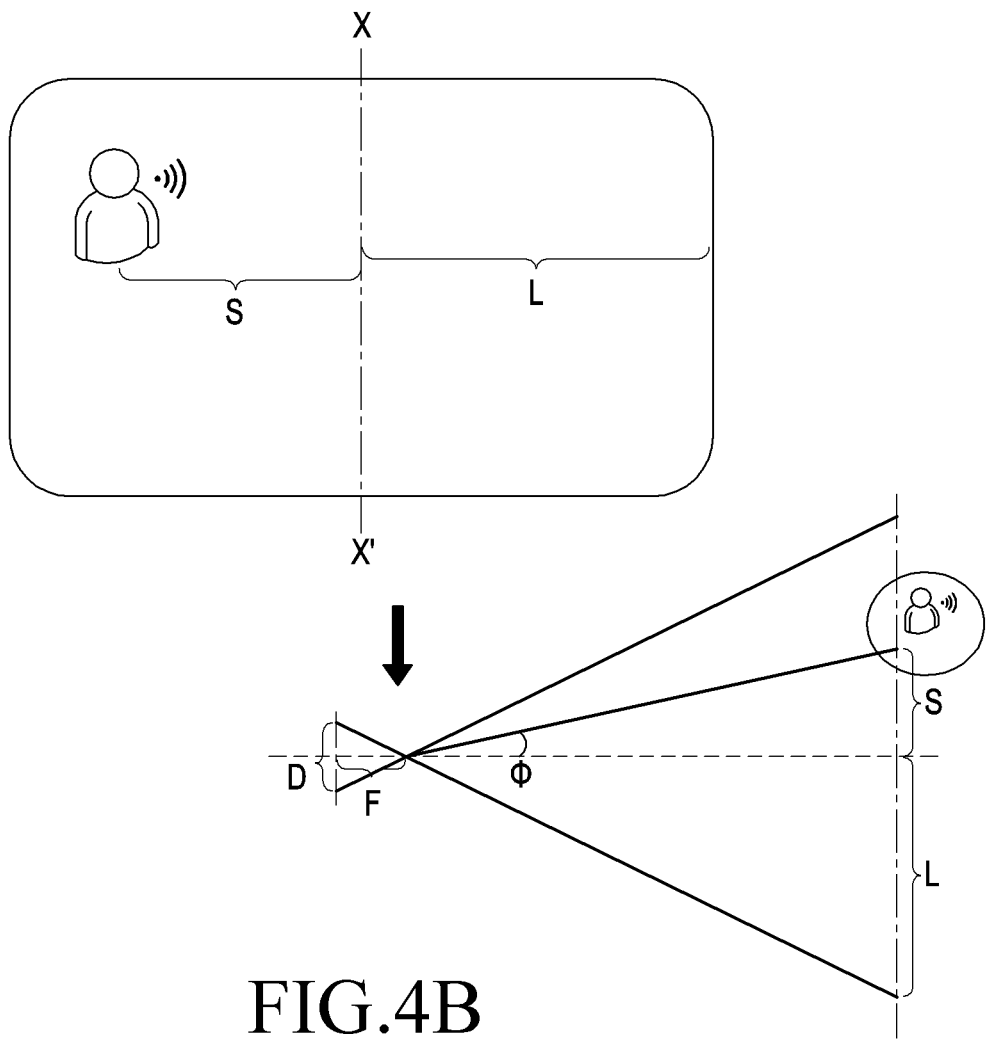

FIGS. 4A and 4B illustrate operations for recording a mixed audio signal and reproducing directional audio therefrom, according to an embodiment.

Referring to FIG. 4A, the media is a live video recording of three human sources, source S1, source S2, and source S3. The input receiving module 214 receives a user input 402 that selects source S1.

Referring to FIG. 4B, the audio recording module 212 determines a distance (S) between the selected source S1 and central axis XX' in a camera preview, a half-width (L) of camera preview, a size (D) of an image sensor of the camera unit 312, and a focal length (F) of a lens of the camera unit 312. The audio recording module 212 determines azimuthal and elevation angles using Equation (1) as applied on the horizontal and the vertical axes, respectively.

$$\emptyset = \tan^{-1}\left[\frac{S}{L} * \frac{D}{2F}\right] \quad (1)$$

The audio recording module 212 then combines the azimuthal angle and elevation angle to determine a direction of arrival (θ) of audio from the selected source S1 using Equation (2).

$$\cos \theta = \sin(\text{azimuthal angle}) * \cos(\text{elevation angle}) \quad (2)$$

Further, the audio recording module 212 determines an axis of the microphones 104-1, 104-2, 104-3, and 104-4 is not horizontal. As such, the audio recording module 212 rotates a field of view in accordance with the tilt of the axis of the microphones 104-1, 104-2, 104-3, and 104-4.

In the above example, the central axis XX' tilted in a clockwise direction is at angle θ and the distance (S) between the selected source S1 and central axis XX' in XY coordinates is (x, y). The audio recording module 212 removes the tilt and determines the distance (S) between the selected source S1 and central axis XX' (x', y') using Equation (3).

$$\begin{pmatrix} x' \\ y' \end{pmatrix} = \begin{pmatrix} \cos\theta & -\sin\theta \\ \sin\theta & \cos\theta \end{pmatrix}\begin{pmatrix} x \\ y \end{pmatrix} \quad (3)$$

Alternatively, the input receiving module 214 receives a user input that selects each of the active audio sources in media including the mixed audio signal 110. The media can be live video recording of the real world environment having the active audio sources on the electronic device 102 using the camera unit(s) 312. The user input can be touch-input or non-touch input on the electronic device 102. The audio recording module 212 tracks the active audio sources based on at least one of a learned model, the at least one audio parameter, at least one physiological feature of the active audio source, and/or at least one beam formed on the selected active audio source. The audio recording module 212 tracks the active audio sources using the at least one physiological feature when the audio source is a human. Examples of the at least one physiological feature include lip movement of the source, etc. The audio recording module 212 tracks the active audio sources using the at least one beam when the audio source is a non-human.

Figure 5A:
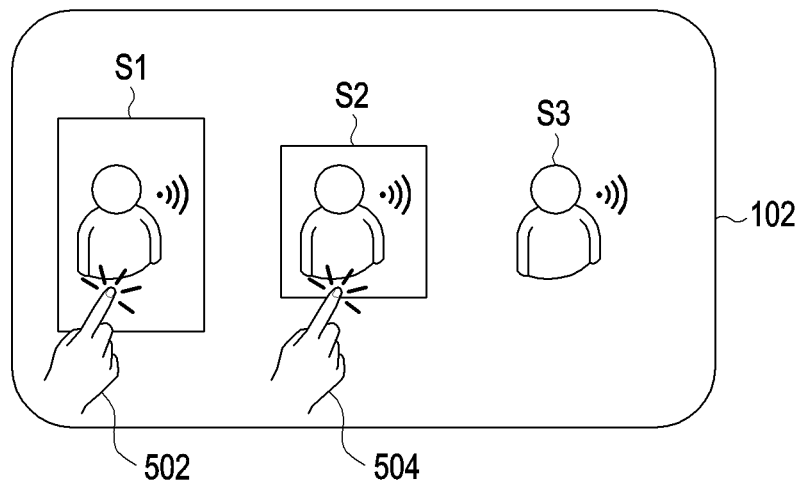
FIGS. 5A and 5B illustrate operations for recording a mixed audio signal and reproducing directional audio therefrom, according to an embodiment.
Figure 5B:
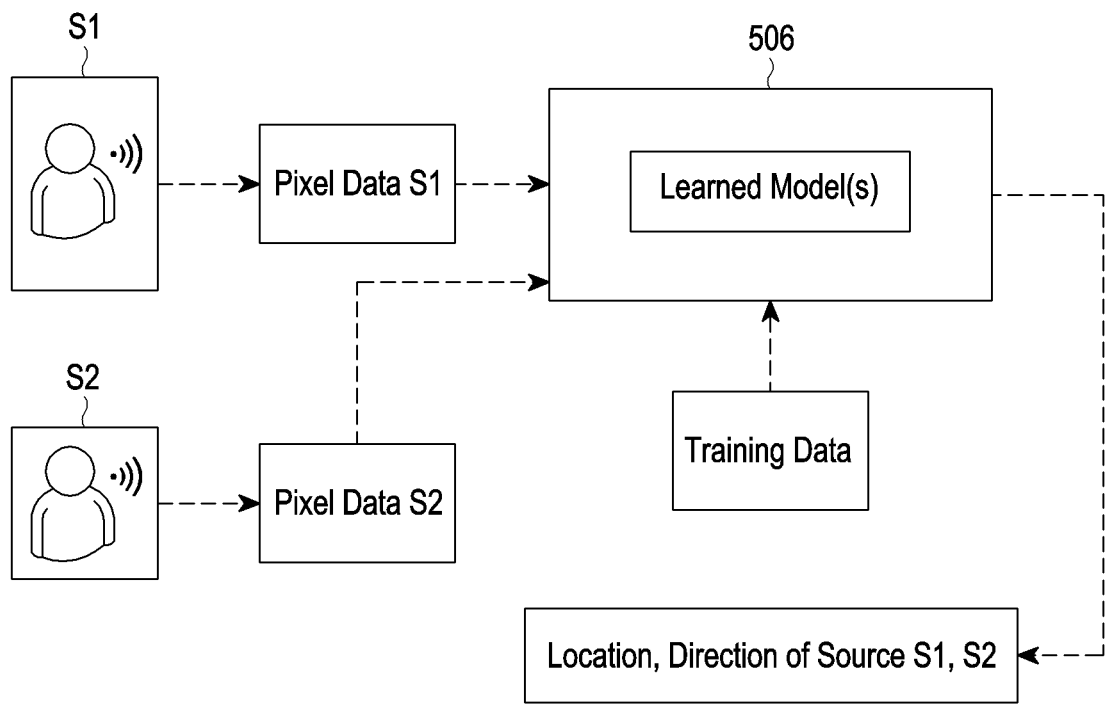

FIGS. 5A and 5B illustrate operations for recording a mixed audio signal and reproducing directional audio therefrom, according to an embodiment.

Referring to FIG. 5A, the media is a live video recording of three human sources, source S1, source S2, and source S3. The input receiving module 214 receives user inputs 502 and 504 that select source S1 and source S2, respectively.

Referring to FIG. 5B, the audio recording module 212 tracks the selected sources by implementing neural network 506. Examples of the neural network 506 include a convolution neural network (CNN), a deep-CNN, a hybrid-CNN, etc. The audio recording module 212 creates boundary boxes around the selected sources to obtain pixel data. The neural network 506 generates learned model(s) by processing training data. The audio recording module 212 applies pixel data of the selected sources S1 and S2 to the neural network 506 and obtains location and direction of the selected sources S1 and S2 as the output.

Figure 6A:
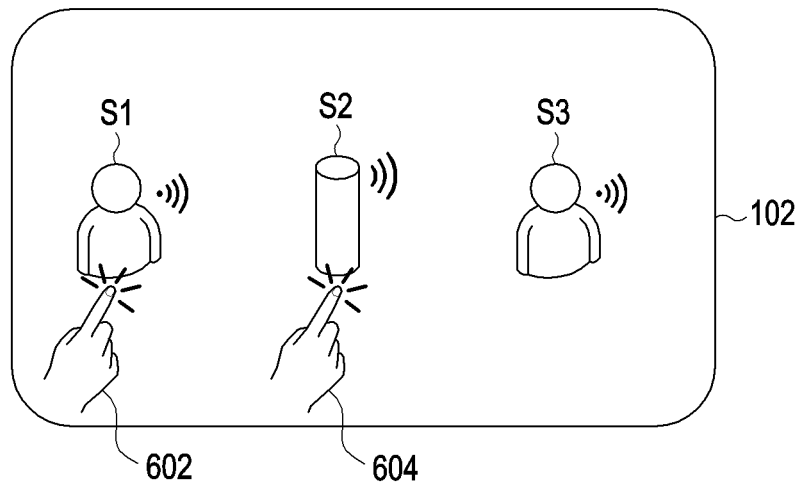
FIGS. 6A and 6B illustrate operations for recording a mixed audio signal and reproducing directional audio therefrom, according to an embodiment.
Figure 6B:
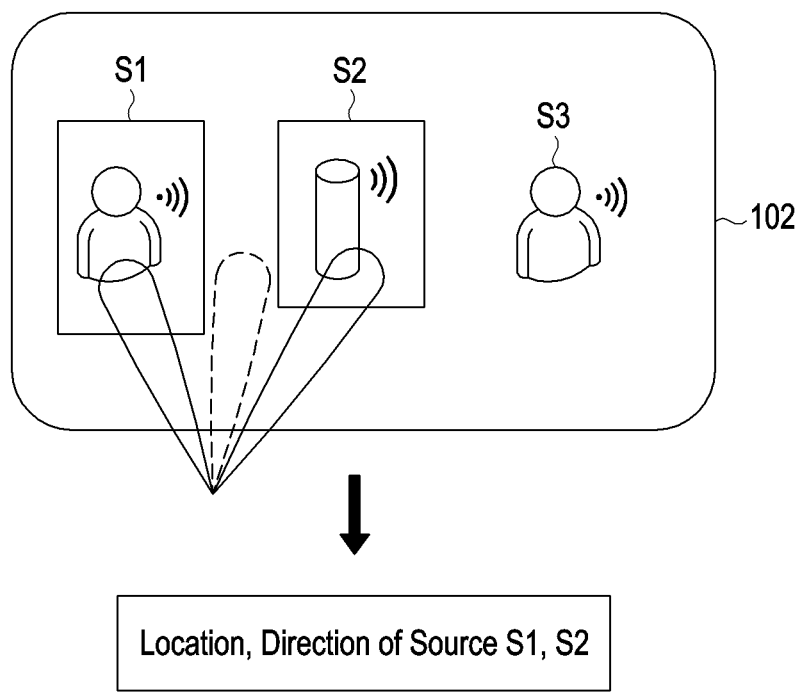

FIGS. 6A and 6B illustrate operations for recording a mixed audio signal and reproducing directional audio therefrom, according to an embodiment.

Referring to FIG. 6A, the media is a live video recording of human sources S1 and S3, and a non-human source S2. The non-human source S2 can be an animal, such as a bird, a natural audio source, an electronic device, etc. The input receiving module 214 receives user inputs 602 and 604 that select source S1 and source S2, respectively. The audio recording module 212 then identifies the selected sources S1 and S2 using separate techniques. The audio recording module 212 identifies the selected source S1 based on lip movement of the source S1. Upon identifying the selected source S1, the audio recording module 212 may also perform gender classification using techniques or standards as known in the art, such as MFCC, pitch based gender recognition, neural networks, etc.

The audio recording module 212 may identify the selected source S2 by using a beamforming technique or a spatial filtering technique. Beamforming may be used to direct and steer directivity beams of the microphones 104-1, 104-2, 104-3, and 104-4 in a particular direction based on a direction of audio source.

The audio recording module 212 may obtain audio signals from the microphones 104-1, 104-2, 104-3, and 104-4 and steer beams in directions of all the active audio sources in order to maximize output energy, or the audio recording module 212 may obtain audio signals from the microphones 104-1, 104-2, 104-3, and 104-4 and steer beams in directions of selected audio sources in order to maximize output energy. Examples of the beamforming techniques include fixed beamforming techniques such as delay-and-sum, filter-and-sum, weighted-sum, etc., and adaptive beamforming techniques such as a generalized sidelobe canceller (GSC) technique, a linearly constrained minimum variance (LCMV) technique, as proposed by Frost, an in situ calibrated microphone array (ICMA) technique, a minimum variance distortionless response (MVDR) beamformer technique or a Capon beamforming technique, a Griffith Jim beamformer technique, etc.

Referring to FIG. 6B, the audio recording module 212 obtains the audio signals from the microphones 104-1, 104-2, 104-3, and 104-4 and steers beams in directions of the sources S1 and S2, which were selected using the user inputs 602 and 604, respectively. The audio recording module 212 then identifies the source when an energy of beam corresponding to the selected source is higher than the other beams. The energy of beams in direction of selected sources S1 and S2 (as represented using solid lines) is higher than the energy of a beam in direction of space between source S1 and source S2 (as represented using a dashed line). As such, the audio recording module 212 identifies the sources S1 and S2 as the active audio sources. Upon identification of the source, the audio recording module 212 tracks the sources based on pitch of the source and determines location and direction of the selected sources S1 and S2.

Alternatively, the audio recording module 212 determines the absolute direction of the active audio sources using the magnetometer reading of the electronic device 102 in conjunction with relative orientation of the active audio sources determined as explained earlier. That is, the audio recording module 212 determines the magnetometer reading of the electronic device 102 using the magnetometer sensor. The audio recording module 212 then determines azimuthal direction 4) of the audio source with respect to a normal on a binaural axis of the electronic device 102 using any of the above described methods. The binaural axis is an assumed axis parallel to an ear axis of a user hearing a recording using the electronic device 102. The audio recording module 212 then determines the direction of the source is M+φ if the audio source is to the right of the normal. The audio recording module 212 then determines the direction of the source is M−φ if the audio source is to the left of the normal. The audio source may be moving or dynamic, e.g., a bird, human speaker in a conference, etc. Accordingly, the audio recording module 212 may determine the direction periodically, e.g., every 4 seconds.

Figure 7A:
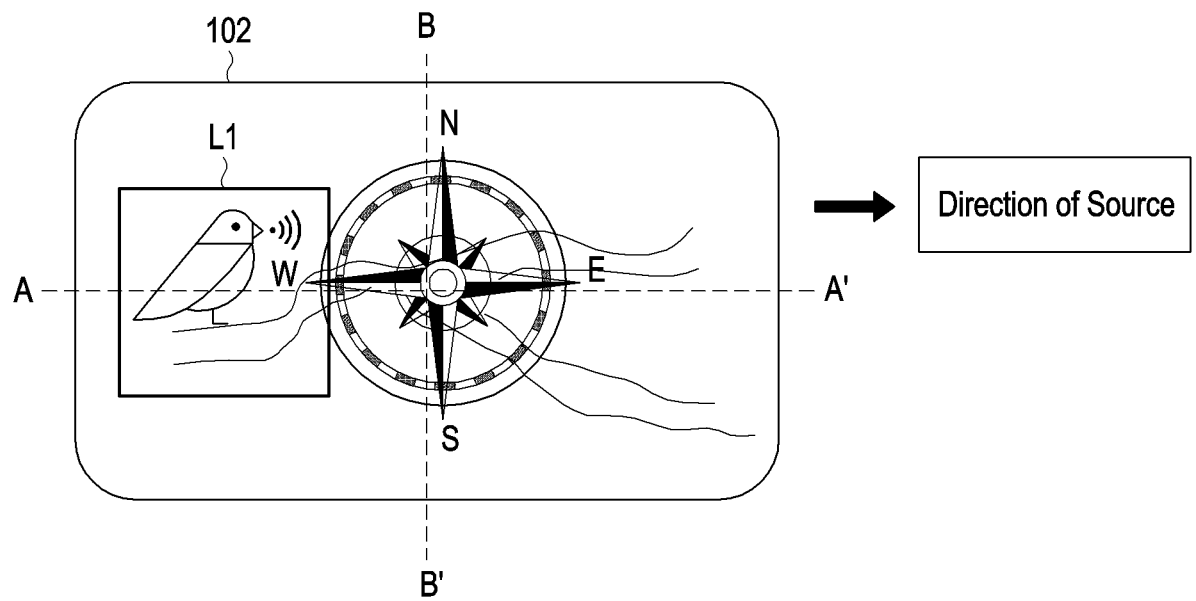
FIGS. 7A and 7B illustrate operations for recording a mixed audio signal and reproducing directional audio therefrom, according to an embodiment.
Figure 7B:
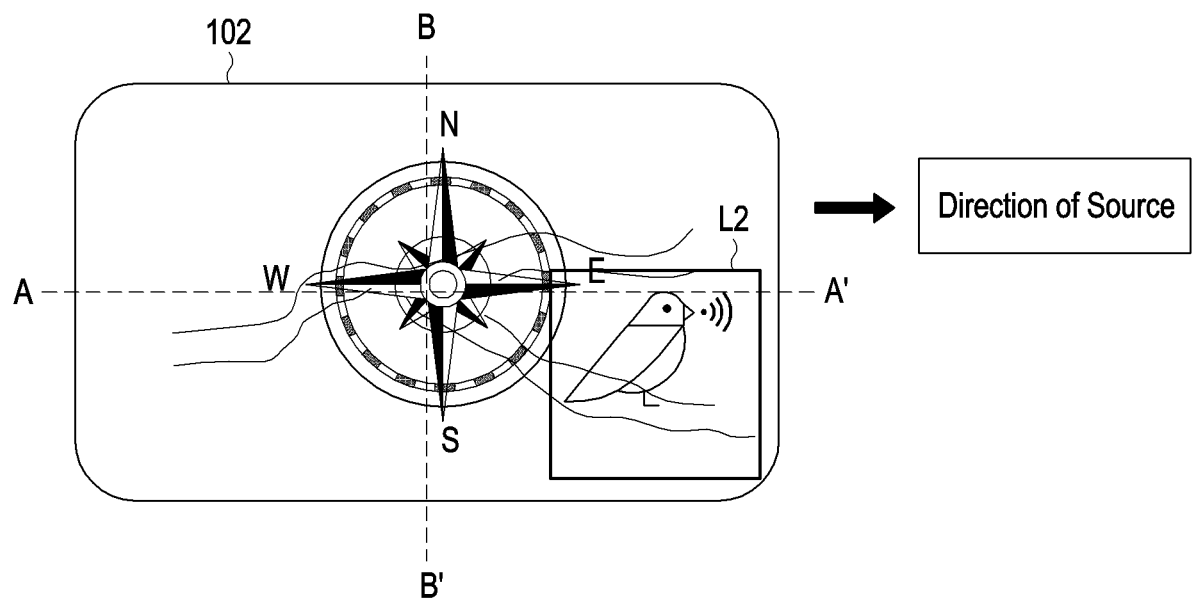

FIGS. 7A and 7B illustrate operations for recording a mixed audio signal and reproducing directional audio therefrom, according to an embodiment.

Referring to FIG. 7A, the binaural axis of the electronic device 102 is represented as AA', bisecting a screen of the display unit horizontally. The audio recording module 212 determines or tracks a bird at location L1 and determines the absolute direction as shown below:

Azimuthal Angle φ=−15 degrees (negative, since it is right of normal (BB') to the binaural axis AA') Magnetometer Reading=120 degrees East (assumed)

Absolute direction=120−15=105 degrees East

Referring to FIG. 7B, the audio recording module 212 determines or tracks the bird at location L2 after elapse of time T and determines the absolute direction as shown below:

Azimuthal Angle φ=+15 degrees (positive, since it is right of normal (BB') to the binaural axis AA')

Magnetometer Reading=120 degrees East (assumed)

Absolute direction=120+15=135 degrees East

Upon determining the active audio sources, the number of active audio sources, the direction of each of the active audio sources, the positional information of each of the active audio sources, and the at least one audio parameter, the audio recording module 212 selects a set of microphones from the plurality of microphones 104-1, 104-2, 104-3, and 104-4 based on at least one of the number of active audio sources, the direction of each of the active audio sources, the positional information of each of the active audio sources, the at least one audio parameter, and/or at least one predefined condition, e.g., one of Conditions A to D below. The audio recording module 212 selects the set of microphones such that a number of microphones selected are equal to the number of active audio sources. The audio recording module 212 selects the at least one predefined condition based on the number of active audio sources and the at least one audio parameter. Thereafter, the audio recording module 212 records the mixed audio signal in accordance with the selected set of microphones for reproducing directional audio from the recorded mixed audio signal. The audio recording module 212 may disable the remaining microphones from the plurality of microphones 104-1, 104-2, 104-3, and 104-4.

Alternatively, the audio recording module 212 may use the mixed audio signal from the remaining microphones for noise cancellation or noise suppression. The audio recording module 212 may record the mixed audio signal using techniques as known in the art.

The at least one predefined condition includes:

a. Condition A: selecting a first microphone and a second microphone from the plurality of microphones such that a distance between the first microphone and a second microphone is substantially equal to half of the dominant wavelength of the mixed audio signal;

b. Condition B: selecting a third microphone from the plurality of microphones such that intensity associated with the mixed audio signal received at the third microphone is at a maximum, and the third microphone is different from the first microphone and the second microphone;

c. Condition C: selecting a fourth microphone from the plurality of microphones such that intensity associated with the mixed audio signal received at the second microphone is at a minimum, and the fourth microphone is different from the first microphone, the second microphone, and the third microphone; and d. Condition D: selecting a set of microphones from a plurality of sets of microphones based on an analysis parameter derived for each of the plurality of sets of microphones, wherein the plurality of microphones are grouped into the plurality of sets of microphones based on the number of active audio sources.

The audio recording module 212 may select the at least one predefined condition based on the number of active audio sources and the at least one audio parameter. Table 1 below illustrates applicability of each of the conditions based on the number of active audio sources. Table 1 may be pre-stored in the memory 304 or the memory 204 during manufacturing of the electronic device 102 or while performing a system update on the electronic device 102.

TABLE 1

| Active audio sources = 2 Microphones >= 3 | Active audio sources = 3 Microphones >= 4 | Active audio sources = 4 Microphones >= 5 | Active audio sources >= 5 Microphones >= 6 |
| --- | --- | --- | --- |
| Condition A OR Condition D | Condition A + Condition B OR Condition D | Condition A + Condition B + Condition C OR Condition D | Condition A + Condition B + Condition C + Condition D+ |

Condition A: selecting a first microphone and a second microphone from the plurality of microphones 104-1, 104-2, 104-3, and 104-4 such that a distance between the first microphone and the second microphone is substantially equal to half of the dominant wavelength of the mixed audio signal.

The microphones should be sufficiently separated from each other for better source separation. Typically, sufficiently separated microphones indicate the distance between the microphones should be closer to half of the wavelength that is contributing significant energy/intensity at any of the microphones. Accordingly, the audio recording module 212 identifies a microphone that has received highest energy/intensity from the audio parameters determined for each of the plurality of microphones 104-1, 104-2, 104-3, and 104-4. The audio recording module 212 then applies Fourier transformation to the mixed audio signal and measures energy of each frequency component in the mixed audio signal. Based on the measure energy, the audio recording module 212 identifies dominant frequency which contains the highest energy. The audio recording module 212 then calculates wavelength of the dominant frequency as the dominant wavelength of the mixed audio signal.

Upon determining the dominant wavelength, the audio recording module 212 creates pairs of microphones from the plurality of microphones 104-1, 104-2, 104-3, and 104-4. The audio recording module 212 then calculates a distance between microphones in each pair and selects the pair having distance substantially equal to half of the dominant wavelength. The microphones in the selected pair are referred to as the first microphone and the second microphone.

Condition B: selecting a third microphone from the plurality of microphones such that intensity associated with the mixed audio signal received at the third microphone is maximum. The third microphone is different from the first microphone and the second microphone.

Condition C: selecting a fourth microphone from the plurality of microphones such that intensity associated with the mixed audio signal received at the fourth microphone is minimum. The fourth microphone is different from the first microphone, the second microphone, and the third microphone.

Identifying various frequency components of the mixed audio signal is easier if intensity variation between two microphones is larger, resulting in easier identification of audio sources. Accordingly, upon selecting the first microphone and the second microphone, the audio recording module 212 identifies a microphone from remaining microphones that has received the highest energy/intensity from the audio parameters determined for each of the plurality of microphones 104-1, 104-2, 104-3, and 104-4. Likewise, upon selecting the third microphone, the audio recording module 212 identifies a microphone from remaining microphones which has received the lowest energy/intensity from the audio parameters determined for each of the plurality of microphones 104-1, 104-2, 104-3, and 104-4.

Condition D: selecting a set of microphones from a plurality of sets of microphones based on an analysis parameter derived for each of the plurality of sets of microphones. The plurality of microphones is grouped into the plurality of sets of microphones based on the number of active audio sources.

The audio recording module 212 groups the microphones in each of the plurality of sets of microphones in a predefined order (e.g., sorted order) based on intensities determined for each of the plurality of microphones 104-1, 104-2, 104-3, and 104-4. The order can be an ascending order or a descending order, and can be predefined in the memory 204 during manufacturing of the electronic device 102 or while performing a system update on the electronic device 102.

Upon grouping, the audio recording module 212 derives the analysis parameter for each of the plurality of sets of microphones. The analysis parameter may be a difference of adjacent intensities in each of the plurality of sets of microphones, or may be a product of the difference of adjacent intensities in each of the plurality of sets of microphones. Thereafter, the audio recording module 212 selects the set of microphones such that the analysis parameter derived for the set of microphones is at a maximum among the analysis parameter derived for each of the plurality of sets of microphones.

The plurality of sets of microphones may also include at least two of the first microphone, the second microphone, the third microphone, and the fourth microphone, while the number of active audio sources is greater than four (4). Upon selecting the aforementioned microphones, the audio recording module 212 initially divides the remaining microphones into different sets and then adds the aforementioned microphones into each set such that number of microphones in each set is equal to the number of active audio sources.

Further, upon selecting the set of microphones and recording the mixed audio signal, the audio recording module 212 may record a mixed audio signal for audio zooming. Audio zooming allows the enhancing of an audio signal from an audio source at desired direction while suppressing interference from audio signals of other audio sources. The input receiving module 214 may receive a user input selecting the active audio source for audio zooming. The user input can be touch-input or non-touch input on the electronic device 102 recording the mixed audio signal. For example, a user input for audio-zooming may be same as the user input for selecting active audio source(s) for tracking. Alternatively, a user input for audio zooming may be received subsequent to receiving the user input for tracking selected audio source(s). For example, the user input for selecting active audio source(s) for tracking may be received as a touch-input and subsequently the user input for selecting audio zooming may be received as a pinch-out gesture. The audio recording module 212 may perform audio zooming using techniques as known in the art.

The audio recording module 212 may use the mixed audio signal received from remaining microphones for various applications such as noise suppression/cancellation. For example, if the electronic device 102 is smartphone with three microphones, upon receiving/making a voice call in a speakerphone mode, the number of active audio sources can be detected as two (2), i.e., a user of the smartphone and ambient noise. Two microphones with a distance closest to half of the dominant wavelength in the voice of the user will be selected. After the selection, the remaining microphone may be used for beam-forming and noise suppression.

The active audio sources may remain fixed or stationary. In such implementation, the audio recording module 212 may only determine the number of active audio sources and the set of microphones once. The remaining microphones may be disabled to save power and memory consumption. For example, if the electronic device 102 is a smartphone with three microphones, upon receiving/making a voice call in a headset mode, the number of active audio sources can be detected as two, i.e., the user of the smartphone and the ambient noise. Two microphones with a distance closest to half of the dominant wavelength in the voice of the user will be selected. After the selection, the remaining microphone may be disabled.

The audio recording module 212 may detect a change in the real world environment. For example, the change in the real world environment includes a change in the number of active audio sources, a movement of at least one of the active audio sources, a change in at least one audio parameter associated with the mixed audio signal, a change in an orientation of at least one of the plurality of microphones 104-1, 104-2, 104-3, and 104-4, a change in position of the at least one of the plurality of microphones 104-1, 104-2, 104-3, and 104-4, a change in position of the electronic device 102, or any combination of above examples. The audio recording module 212 detects the change based on signal(s) provided by the sensor unit(s) 314 of the electronic device 102. For example, change in position of the electronic device 102 can be detected based on a signal from an accelerometer sensor or gyroscopic sensor. A change in orientation of at least one of the plurality of microphones 104-1, 104-2, 104-3, and 104-4 can be detected based on a signal from the accelerometer sensor.

In response to the detection, the audio recording module 212 determines a number of further active audio sources, the at least one audio parameter, the direction of the further active audio sources, the positional information of the further active audio sources, etc., in a manner as described earlier. The number of further active audio sources may be lesser or greater than the number of active audio sources determined initially, or may include all, some, or none of the number of active audio sources determined initially. Thereafter, the audio recording module 212 determines at least one audio parameter associated with the mixed audio signal received from each of the further active audio sources, as described above. The audio recording module 212 then dynamically selects further microphones from the plurality of microphones 104-1, 104-2, 104-3, and 104-4 based on at least one of the number of further active audio sources, the at least one audio parameter, the direction of the further active audio sources, the positional information of the further active audio sources, and/or the at least one predefined condition, as described above.

The audio recording module 212 may continuously perform the detection of the active audio sources including direction and positional information of the active audio sources and determination of the set of microphones prior to source separation. Examples of such applications include video recording along with the electronic device 102 and audio-mixing using the electronic device 102.

Figure 8:
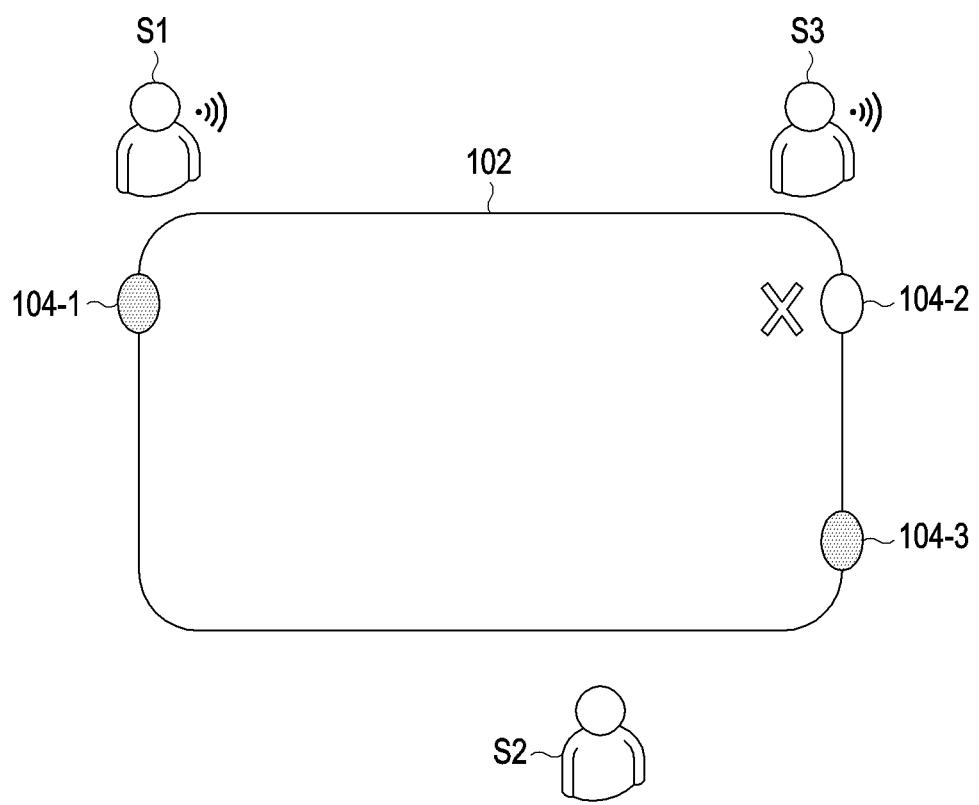
FIG. 8 illustrates an operation for dynamically selecting microphones, according to an embodiment.

FIG. 8 illustrates an operation for dynamically selecting microphones, according to an embodiment.

Referring to FIG. 8, the microphones 104-1, 104-2, and 104-3 (or M1, M2, and M3) are integrated as part of the electronic device 102. The plurality of audio sources are three humans, S1, S2, and S3, of which source S1 and source S3 are generating audio signals while source S2 is not generating any audio signal.

Upon receiving the mixed audio signal, which is a combination of audio signals generated by sources S1 and S3, the audio recording module 212 determines the active audio sources are sources S1 and S3 and that the number of active audio sources is 2, as described above. The audio recording module 212 also determines at least one audio parameter from the mixed audio signal and directions of the sources S1 and S3, as described above.

To select the set of microphones, the audio recording module 212 determines intensities of the mixed audio signal received at each of the microphone 104-1, 104-2, and 104-3 and selects Condition D. The audio recording module 212 sorts the microphones 104-1, 104-2, and 104-3 in a descending order. Distances between the source S1 and source S3 and the microphones 104-1, 104-2, and 104-3 are assumed in Table 2 and distance between microphones 104-1, 104-2, and 104-3 is assumed in Table 3.

TABLE 2

| Source | Microphone | Assumed Distance (cm) |
|---|---|---|
| S1 | M1 | 2 |
| S3 | M2 | 7 |
| S3 | M3 | 9 |

TABLE 3

| Microphones | Assumed Distance (cm) |
|---|---|
| M1, M2 | 20 |
| M2, M3 | 15 |
| M1, M3 | 25 |

Assuming the two active audio sources, i.e., source S1 and source S3, have equal strength with intensity being 1 unit at 1 cm distance, intensities can be calculated by using Equation (4).

$$\text{Detected Intensity} = \frac{\text{Source 1 Intensity}}{\text{Distance } 1^2} + \frac{\text{Source 2 Intensity}}{\text{Distance } 2^2} + \cdots + \frac{\text{Source } n \text{ Intensity}}{\text{Distance } n^2} \quad (4)$$

As such, the detected intensities for microphones M1, M2 and M3 will be:

For M1:

$$\text{Intensity} = \frac{1}{2^2} + \frac{1}{(20+d1)^2} = 0.25,$$

where d1 is the difference of the distance between M1 and a right source when compared with the distance between M1 and M2.

For M2:

$$\text{Intensity} = \frac{1}{7^2} + \frac{1}{(20+d2)^2} = 0.06,$$

where d2 is the difference of the distance between M2 and a left source when compared with the distance between M1 and M2.

For M3:

$$\text{Intensity} = \frac{1}{9^2} + \frac{1}{(25+d3)^2} = 0.03,$$

where d3 is the difference of the distance between M3 and a left source when compared with the distance between M1 and M3.

As the audio sources are assumed to be of equal strength, the sorted order will be M1, M2, M3, since M1 and M2 have sources close to them and M3 does not have an audio source close by.

Table 4 illustrates the microphones 104-1, 104-2, and 104-3 (or M1, M2, and M3) ordered by descending intensities.

TABLE 4

| Microphone | Detected Intensity (units) |
|---|---|
| M1 | 0.25 |
| M2 | 0.06 |
| M3 | 0.03 |

The product of the difference between the intensities will be maximum when M1 and M3 are selected and M2 is ignored. Therefore, the audio recording module 212 selects the microphones M1 and M3 (as represented by dotted pattern), and disables M2 (as represented by cross sign).

Table 5 illustrates the grouping of the microphones 104-1, 104-2, and 104-3 (or M1, M2, and M3) and differences in adjacent intensities.

TABLE 5

| Microphone Pairs | Difference in Intensity (units) |
|---|---|
| M1, M2 | (M1 − M2) = 0.19 |
| M2, M3 | (M2 − M3) = 0.03 |
| M1, M3 | (M1 − M3) = 0.22 |

Figure 9:
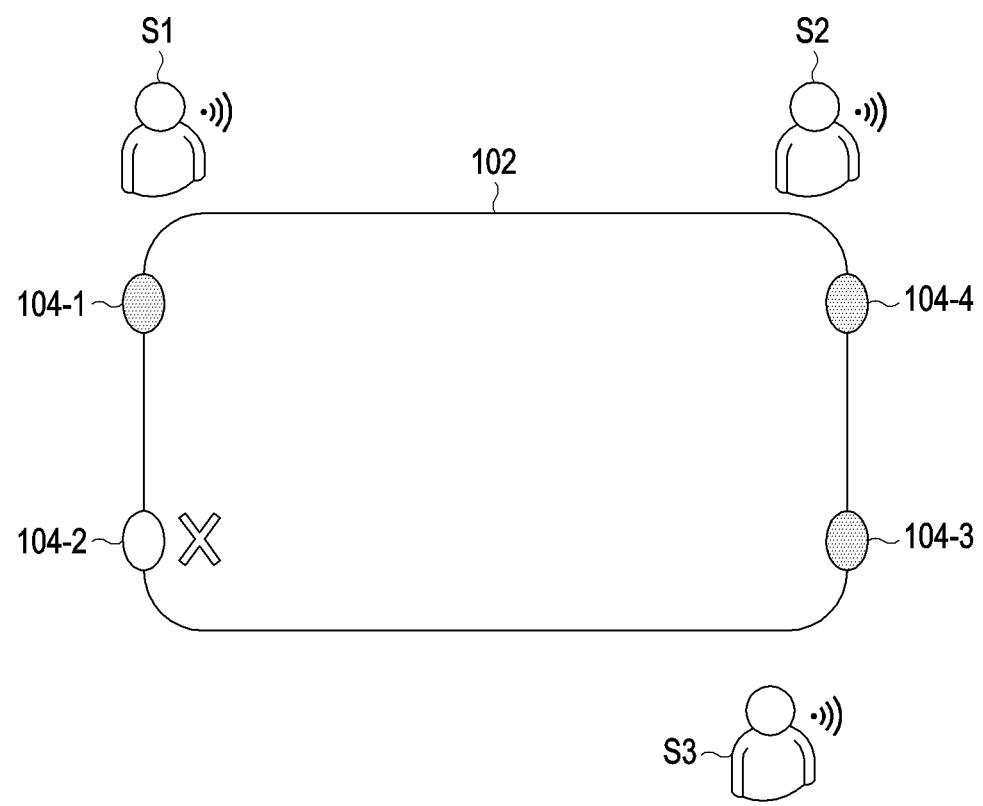
FIG. 9 illustrates an operation for dynamically selecting microphones, according to an embodiment.

FIG. 9 illustrates an operation of dynamically selecting microphones, according to an embodiment.

Referring to FIG. 9, the microphones 104-1, 104-2, 104-3, and 104-4 (or M1, M2, M3, and M4) are integrated as part of the electronic device 102. The plurality of audio sources includes three humans, S1, S2, and S3, who are all generating audio signals by talking.

Upon receiving the mixed audio signal, which is a combination of the audio signals generated by sources S1, S2, and S3, the audio recording module 212 determines the active audio sources are sources S1, S2, and S3 and the number of active audio sources as 3, as described above. The audio recording module 212 also determines the at least one audio parameter from the mixed audio signal and directions of the sources S1, S2, and S3, as descried above.

To select a set of microphones, the audio recording module 212 determines intensities of the mixed audio signal received at each of the microphone 104-1, 104-2, 104-3, and 104-4 and selects Condition D. The audio recording module 212 sorts the microphones 104-1, 104-2, 104-3, and 104-4 in a descending order. The distances between the audio sources S1, S2, and S3 and the microphones 104-1, 104-2, 104-3, and 104-4 (or M1, M2, M3, and M4) are assumed in Table 6 and distances between microphones M1, M2, M3, and M4 are assumed in Table 7.

TABLE 6

| Source | Microphone | Assumed Distance (cm) |
|---|---|---|
| S1 | M1 | 9 |
| S1 | M2 | 10 |
| S3 | M3 | 18 |
| S2 | M4 | 12 |

TABLE 7

| Microphones | Assumed Distance (cm) |
|---|---|
| M2, M2 | 15 |
| M2, M3 | 20 |
| M2, M3 | 25 |
| M2, M4 | 20 |
| M2, M4 | 25 |
| M3, M4 | 15 |

Assuming the three active audio sources have equal strengths with intensity being 1 unit at 1 cm distance, the intensities can be calculated by using Equation (4) above. As such, the detected intensities for microphones M1, M2 and M3 will be:

For M1: Intensity=$1/9^2+i1$=0.012, where i1 includes the sum of intensities from the microphones other than the one closest to M1.

For M2: Intensity=$1/10^2+i2$=0.01, where i2 includes the sum of intensities from the microphones other than the one closest to M2.

For M3: Intensity=$1/18^2+i3$=0.003, where i3 includes the sum of intensities from the microphones other than the one closest to M3.

For M4: Intensity=$1/12^2+i4$=0.007, where i4 includes the sum of intensities from the microphones other than the one closest to M4.

Since i1, i2, i3 and i4 are relatively small, they may be ignored. That is, the final intensities may be obtained at right side by ignoring i1, i2, i3 and i4. As the audio sources are assumed to be of equal strength, the sorted order will be M1, M2, M3, M4.

Table 8 illustrates differences between the intensities.

TABLE 8

| Microphone Pairs | Difference in Intensity (units) |
|---|---|
| M1 – M2 | 2 |
| M2 – M3 | 7 |
| M4 – M3 | 4 |
| M1 – M4 | 5 |
| M2 – M4 | 3 |

The product of differences between the intensities will be at a maximum when M1-M4-M3 is selected and M2 is ignored because M1 and M2 will have close intensities and therefore the difference between the intensities would be small. The intensity recorded in M4 would be more towards the middle between M1 and M3. Since there are 3 sources, grouping of 3 microphones is required.

Table 9 illustrates the products of difference in intensities. The audio recording module 212 selects microphones M1, M3, and M4 (as represented by a dotted pattern) as a product of a difference in intensities is at a maximum compared to other pairs, and M2 is disabled (as represented by a cross sign).

TABLE 9

| Microphone Triples | Product of Difference in Intensity (units$^2$/1000000) |
|---|---|
| M1, M2, M3 | (M1 – M2) * (M2 – M3) = 14 |
| M1, M2, M4 | (M1 – M2) * (M2 – M4) = 6 |
| M1, M4, M3 | (M1 – M4) * (M4 – M3) = 20 |
| M2, M4, M3 | (M2 – M4) * (M4 – M3) = 12 |

Figure 10:
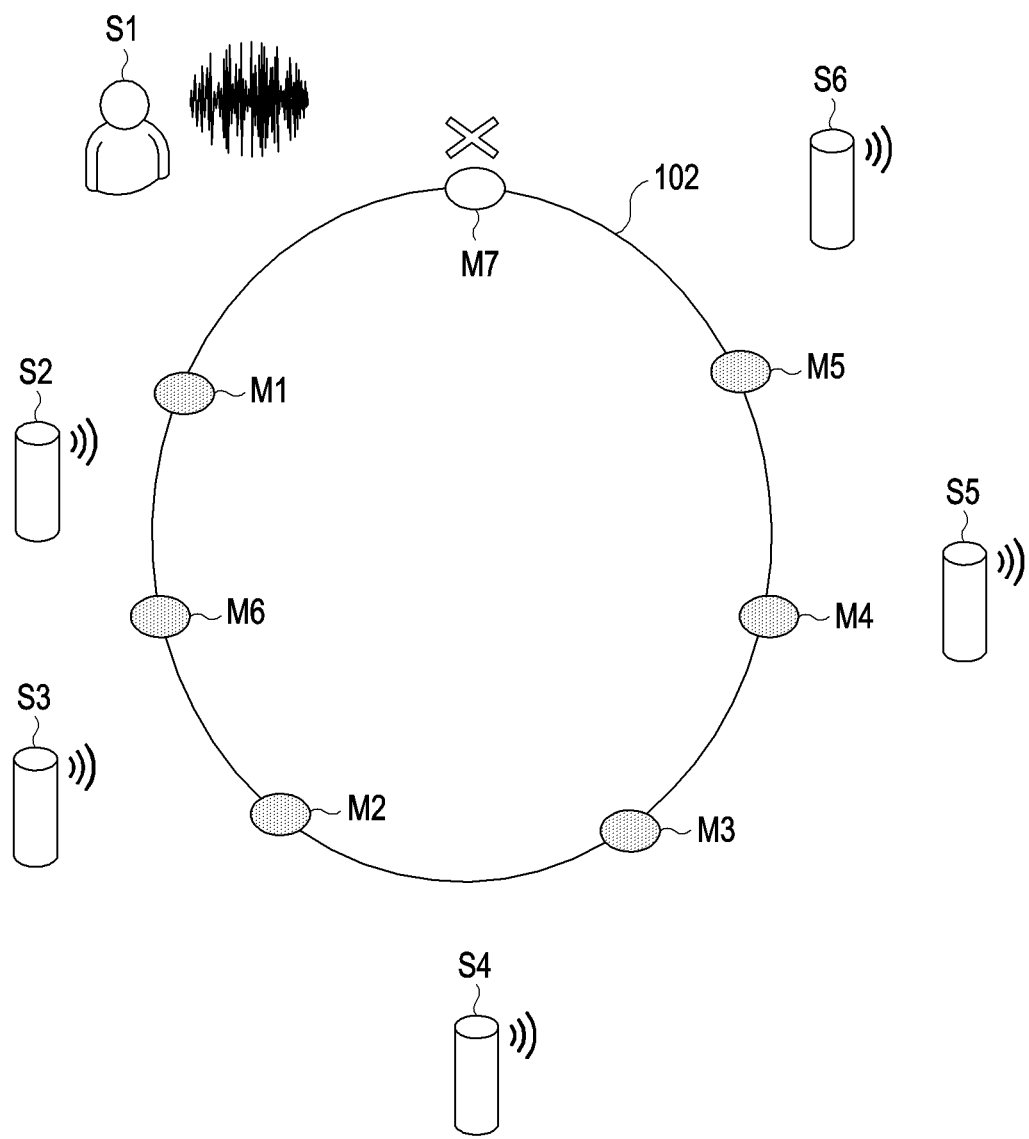
FIG. 10 illustrates an operation for dynamically selecting microphones, according to an embodiment.

FIG. 10 illustrates an operation for dynamically selecting microphones, according to an embodiment.

Referring to FIG. 10, microphones M1 to M7 are integrated as part of the electronic device 102. The microphones M1 to M7 are arranged in a circular form on the electronic device 102. The audio sources include a human source S1 and five non-human audio sources S2 to S6 related to external noise such as ambient noise, audio signals from other devices, etc.

To select the set of microphones, the audio recording module 212 determines intensities of the mixed audio signal received at each of the microphones M1 to M7 and selects Condition A+Condition B+Condition C+Condition D.

In FIG. 10, the audio recording module 212 selects M3 as first microphone and M1 as second microphone having distance substantially equal to dominant wavelength. The audio recording module 212 sorts the microphones M1 to M7 in a descending order as illustrated in below Table 10. The audio recording module 212 selects M1 and M5 as the third microphone and the fourth microphone, respectively. The product of differences between intensities will be maximized when M1, M2, M3, M4, M5, and M6 are selected.

TABLE 10

| Microphone | Detected Intensity (units) |
|---|---|
| M1 | 10 |
| M2 | 9 |
| M3 | 8 |
| M4 | 7 |
| M5 | 4 |
| M6 | 6 |
| M7 | 5 |

As another example, in a meeting room in which the number of members or active audio sources can be more than 5 and the electronic device 102 has more than 5 microphones, all the members generally do not speak at a same time. Therefore, the audio recording module 212 may first identify two microphones using Condition A upon receiving an audio signal from first speaker. Thereafter, the audio recording module 212 may identify different microphones as and when remaining members speak. Upon determination of all of the active audio sources and microphones, the audio recording module 212 may record the mixed audio signal.

As another example, in a lecture hall in which the number of members or active audio sources is more than 5, including speaker and participants, the audio recording module 212 may first identify two microphones using Condition A upon receiving an audio signal from first speaker. Thereafter, the audio recording module 212 may identify different microphones when remaining members speak. Upon determination of all of the active audio sources and microphones, the audio recording module 212 may record the mixed audio signal.

Upon recording the mixed audio signal, the audio recording module 212 stores the recorded mixed audio signal in conjunction with the FI pertaining to the mixed audio signal and the SI pertaining to the selected set of microphones as the audio file 112. The audio file 112 can be any format that may be processed by the plurality of speakers 106.

The FI may include one or more of the active audio sources, the number of active audio sources, the direction of the active audio sources, and/or the positional information of the active audio sources. The direction of the active audio sources can be relative to a direction of the plurality of microphones and/or, relative to a direction of the electronic device and/or relative to a direction of camera unit(s) of the electronic device. The direction of the active audio sources can be determined with respect to a binaural axis of the plurality of microphones and/or with respect to a binaural axis of the electronic device. The FI allows for accurate reproduction of the recorded mixed audio signal, including binaural reproduction or multi-channel reproduction such that directional audio from the active audio sources can be reproduced or emulated. To this end, the audio recording module may define the binaural axis for at least one of the plurality of microphones and the electronic device. The binaural axis may be an assumed axis parallel to an ear axis of a user hearing a recording. The audio recording module may then determine the relative orientation or direction of the active audio source with respect to the binaural axis in a manner as described earlier. The audio recording module may then store the relative orientation or direction of the active audio source with respect to the binaural axis in the audio file as the FI.

The SI may include one or more of position of the selected set of microphones, position of the plurality of microphones, position of the selected set of microphones relative to the plurality of microphones, position of the selected set of microphones relative to the electronic device, and/or position of the selected set of microphones relative to the ground surface. The audio recording module may determine the direction and/or position of the selected set of microphones in a manner as known in the art. The audio recording module may store direction and/or position of the selected set of microphones in the audio file as the SI.

The audio recording module may store the audio file in the memory. The stored audio file may be shared with further electronic devices and/or the plurality of speakers using one or more applications available in the electronic device for reproducing directional audio.

The audio file may be played through the plurality of speakers. For example, a stored audio file may be played on an electronic device for reproducing directional audio through the plurality of speakers using one or more applications available in the electronic device, e.g., social media applications, messaging applications, calling applications, media playing applications, etc. As another example, the audio file may be directly played through the plurality of speakers without storing the audio file.

Accordingly, a system according to an embodiment can reproduce directional audio from an audio file. More specifically, an input receiving module may receive a user input to play the audio file. The user input can be touch-input or non-touch input on the electronic device, a further device, or a speaker. The audio file includes the recorded mixed audio signal in conjunction with the FI and the SI. The user input can indicate to play the audio file from the one or more applications and/or from a memory.

In response to the user input, an audio reproducing module performs source separation in order to obtain a plurality of audio signals corresponding to the active audio sources in the mixed audio signal based on the FI. The audio reproducing module may process the recorded mixed audio signal using blind source separation techniques to separate audio signals from the mixed audio signals. Each of the separated audio signal is single channel or mono-channel audio, i.e., audio from a single source. Examples of blind source separation techniques include IVA, time-frequency (TF) masking, etc. The audio reproducing module may then reproduce the audio signals from one or more speakers based on at least one of the FI and/or the SI.

The audio reproducing module may perform further translation operations such as binaural translation, audio zooming, mode conversion such as from mono-to-stereo, mono-to-multi-channel, such as 2.1, 3.1, 4.1, 5.1, etc., and vice-versa, and acoustic scene classification.

The input receiving module may receive a user input to select one or more of the active audio sources in the mixed audio file for playing. The user input can be touch-input or non-touch input on the electronic device, the further device, or the speakers. The audio reproducing module further determines a number of speakers for playing audio signals based on one of user input and predefined criterion. The user input can be touch-input or non-touch input on the electronic device, the further device, or the speakers. The predefined criterion can indicate a default number of speakers for playing the mixed audio file. The criterion may be pre-stored in a memory during manufacturing of the electronic device, the speakers, or the further device. The criterion may be stored in a memory while performing a system update on the electronic device, the speakers, or the further device. The criterion may be stored in a memory based on a user input in a settings page.

The input receiving module may receive a user input indicating a number of speakers. An audio reproducing module may fetch the predefined criterion from a memory.

The audio reproducing module may perform a translation of each of the plurality of audio signals in order to obtain a translated audio signal based on the FI, a sample delay, and the number of speakers. The translation allows for reproduction of the plurality of audio signals such that the different audio signals in each ear of a user or listener can be altered, creating an immersive experience for the listener where the listener can hear audio signals in all directions around oneself, as if the listener was present at the time of recording.

The audio reproducing module may determine the sample delay based on average distance between human ears (D), a sampling rate of audio signal (f), the speed of sound (c), and a direction of the active audio sources (Ø), in real time, using Equation (5) below. The direction of the active audio sources (Ø) may be obtained from the audio file. The distance between human ears (D), the sampling rate of audio signal (f), and the speed of sound (c) may be predefined and stored in the memory during manufacturing of the electronic device, the further device, or the speakers.

$$\text{sample delay} = f \times \frac{D \sin \emptyset}{c} \quad (5)$$

The audio reproducing module may copy the single channel into plurality of channels based on the number of speakers. For example, the plurality of channels can be two, one for right ear and one for left ear, or can be 6 in order to provide surround sound experience. The audio reproducing module may add the sample delay to the beginning of a second channel and each of subsequent channels in order to generate the translated audio signal. Thus, the translated audio signal is an accurate representation of the source along with a relative orientation of the source in space. The audio reproducing module may add the sample delay by using phase shifters. Therefore, the translation of audio signals may generate one signal without delay and other signal(s) with delay. The audio reproducing module may reproduce the translated audio signals from one or more speakers based on at least one of the FI and/or the SI.

The translated audio signals can be reproduced separately or together based on user input. The input receiving module may receive a user input to select one or more of the active audio sources in the audio file for playing. The audio reproducing module may combine the translation of the plurality of audio signals corresponding to the one or more selected active audio sources to obtain a further translated audio signal. The audio reproducing module may reproduce the further translated audio signal from the plurality of speakers based on at least one of the FI and/or the SI.

Figure 11:
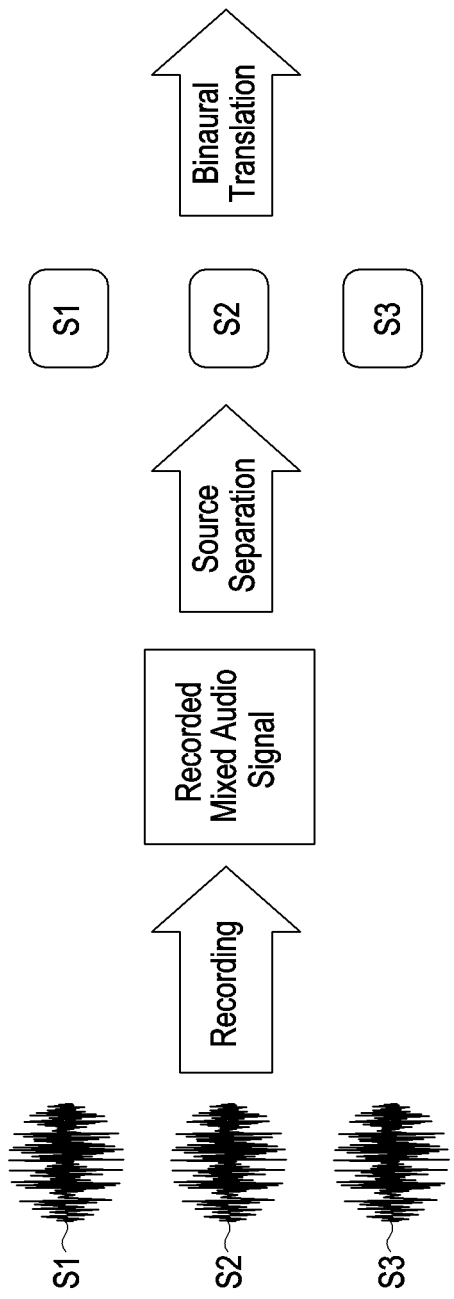
FIG. 11 illustrates an operation for generating and reproducing binaural audio signals or two-channel audio signals, according to an embodiment.

FIG. 11 illustrates an operation for generating and reproducing binaural audio signals or two-channel audio signals, according to an embodiment.

Referring to FIG. 11, three active audio sources S1, S2, and S3 are determined at a location and audio signals generated by the active audio sources S1, S2, and S3 are received as mixed audio signal. The mixed audio signal is recorded as described above. Audio signals are then separated from the recorded mixed audio signal in order to obtain audio signals of each active audio source. The separated audio signals are binaural translated for two channels, channel 1 (L) and channel 2 (R), to obtain six (6) binaural audio signals, S1 channel 1, S1 channel 2, S2 channel 1, S2 channel 2, S3 channel 1, and S3 channel 2. Channel 1 correspond to a speaker placed to the left (L) of the user and channel 2 correspond to a speaker placed to the right (R) of the user.

When a user input is received that indicates playing all the sources, the audio reproducing module reproduces the binaural audio signals S1 channel 1, S2 channel 1, S3 channel 1 from the left speaker and the binaural audio signals S1 channel 2, S2 channel 2, S3 channel 2 from the right speaker.

When a user input is received that indicates playing source S1 and S2 together, the audio reproducing module reproduces the binaural audio signals S1 channel 1, S2 channel 1 from the left speaker and the binaural audio signals S1 channel 2, S2 channel 2 from the right speaker. The audio reproducing module may suppress or not reproduce the binaural audio signals S3 channel 1 and S3 channel 2.

When a user input is received that indicates playing source S2 only, the audio reproducing module reproduces the binaural audio signal S2 channel 1 from the left speaker and the binaural audio signal S2 channel 2 from the right speaker. The audio reproducing module 216 may suppress or not reproduce the binaural audio signals S1 channel 1, S1 channel 2, S3 channel 1, and S3 channel 2.

When a user input is received that indicates zooming or converting of audio into mono or stereo, the audio reproducing module reproduces the binaural audio signals.

An input receiving module may receive a user input to select one or more of the active audio sources in the mixed audio file for audio zooming. Audio zooming allows for enhancing audio signal from an audio source at desired direction while suppressing interference from audio signals of other audio sources. The input receiving module may receive a user input that indicates a selection of an active audio source in the audio file. The audio reproducing module may apply filtering techniques to remove interference from other sources.

The input receiving module may receive a user input that selects one or more of the active audio sources in the mixed audio file for audio mode conversion, such as mono to stereo, mono to multi-channel such as 2.1, 3.1, 4.1, 5.1, etc., and vice-versa. The input receiving module may receive a user input that indicates the selection of the active audio source in the audio file. The audio reproducing module may implement various mode conversion techniques, such as fast forward moving pictures expert group (FFmpeg) techniques, etc., to change the mode.

The audio reproducing module may perform acoustic scene classification based on the separated audio signals from the mixed audio signal. Acoustic scene classification may include recognition of and categorizing an audio signal that identifies an environment in which the audio has been produced. The audio recording module may perform acoustic scene classification using learning models such as Deep CNN, etc.

Figure 12:
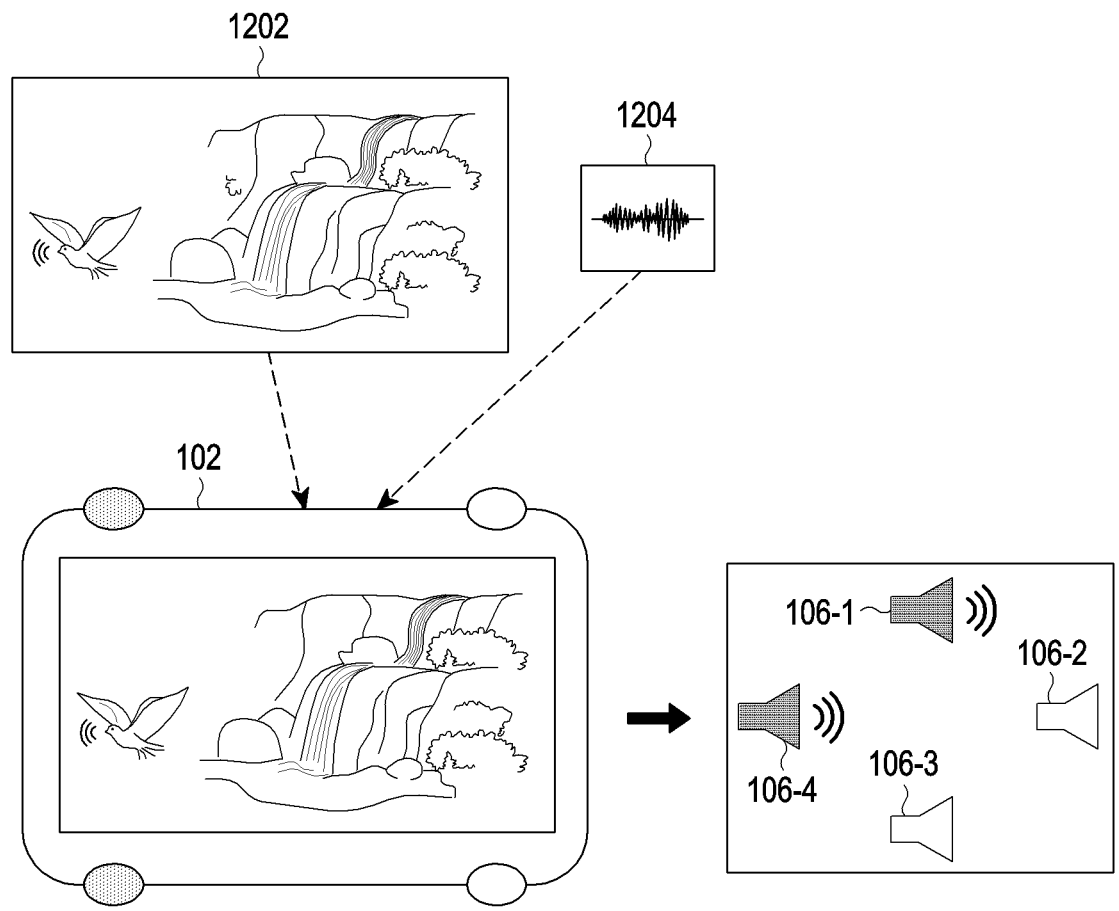
FIG. 12 illustrates an operation for recording a mixed audio signal and reproducing directional audio therefrom, according to an embodiment.

FIG. 12 illustrates an operation for recording mixed audio and reproducing directional audio therefrom, according to an embodiment.

Referring to FIG. 12, the electronic device 102 is a smart phone with 4 integrated microphones (represented using circles). The electronic device 102 is also connected with speakers 106-1, 106-2, 106-3, and 106-4.

A video recording of a public picnic place having active audio sources, such as a bird and a waterfall, is made using the electronic device 102. The electronic device 102 receives a video signal 1202 and a mixed audio signal 1204 through the live video recording. An audio recording module of the electronic device 102 determines the active audio sources as the bird and the waterfall, and number of active audio sources as two (2). The audio recording module determines the direction of the active audio sources and dynamically selects two (2) of the microphones (as represented by the shaded circles) for recording the mixed audio signal. The mixed audio signal from the remaining microphones (as represented without any shading) is used for noise suppression after beamforming and source separation. The audio recording module may store the recorded mixed audio signal with FI and SI as an audio file.

The electronic device 102 may then receive a user input to play the audio file. An audio reproducing module of the electronic device 102 may perform source separation in order to obtain the plurality of audio signals corresponding to the bird and the waterfall from the mixed audio signal based on the FI. The audio reproducing module may reproduce the separated audio signals of both the bird and the waterfall via the speakers 106-1 and 106-4 based on the FI and the SI.

Figure 13:
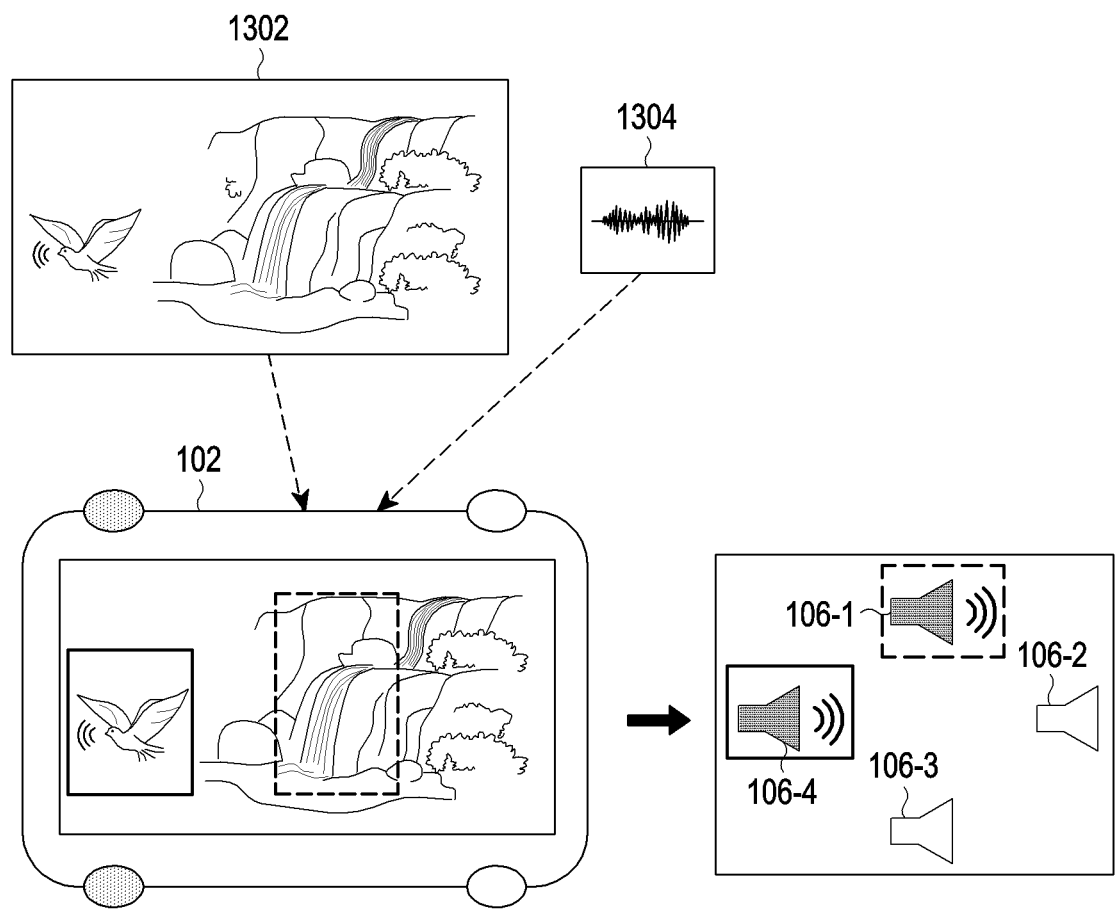
FIG. 13 illustrates an operation for recording a mixed audio signal and reproducing directional audio therefrom, according to an embodiment.

FIG. 13 illustrates an operation for recording mixed audio and reproducing directional audio therefrom, according to an embodiment.

Referring to FIG. 13, the electronic device 102 is a smart phone with 4 integrated microphones (as represented using circles). The electronic device 102 is also connected with the plurality of speakers 106-1, 106-2, 106-3, and 106-4.

A video recording of a public picnic place having active audio sources of a bird and a waterfall is made using the electronic device 102. The electronic device 102 receives a video signal 1302 and a mixed audio signal 1304. An audio recording module of the electronic device 102 determines the active audio sources as the bird and the waterfall based on a selection of the active audio sources by the user (as represented using the square boxes), and number of active audio sources being two (2). The audio recording module determines the direction of the active audio sources and dynamically selects two (2) microphones (as shaded) for recording the mixed audio signal. The mixed audio signal from the remaining microphones (without shading) is used for noise suppression after beamforming and source separation. The audio recording module stores the recorded mixed audio signal along with FI and SI as an audio file.

The electronic device 102 then receives a user input to play the audio file. An audio reproducing module of the electronic device 102 performs source separation in order to obtain the plurality of audio signals corresponding to the bird and the waterfall from the mixed audio signal based on the FL The audio reproducing module reproduces the audio signals of the bird from the speaker 106-4 (as indicated by solid square) based on the selection of the user while recording the mixed audio signal, the direction of the bird, and the direction of the speaker 106-4 since the direction of the speaker 106-4 is closest to the direction of the bird. The audio reproducing module reproduces the audio signals of the waterfall from the speaker 106-1 (as indicated by dashed square) based on the selection of the user while recording the mixed audio signal, the direction of the waterfall, and the direction of the speaker 106-1 since direction of the speaker 106-1 is closest to the direction of the waterfall.

Figure 14:
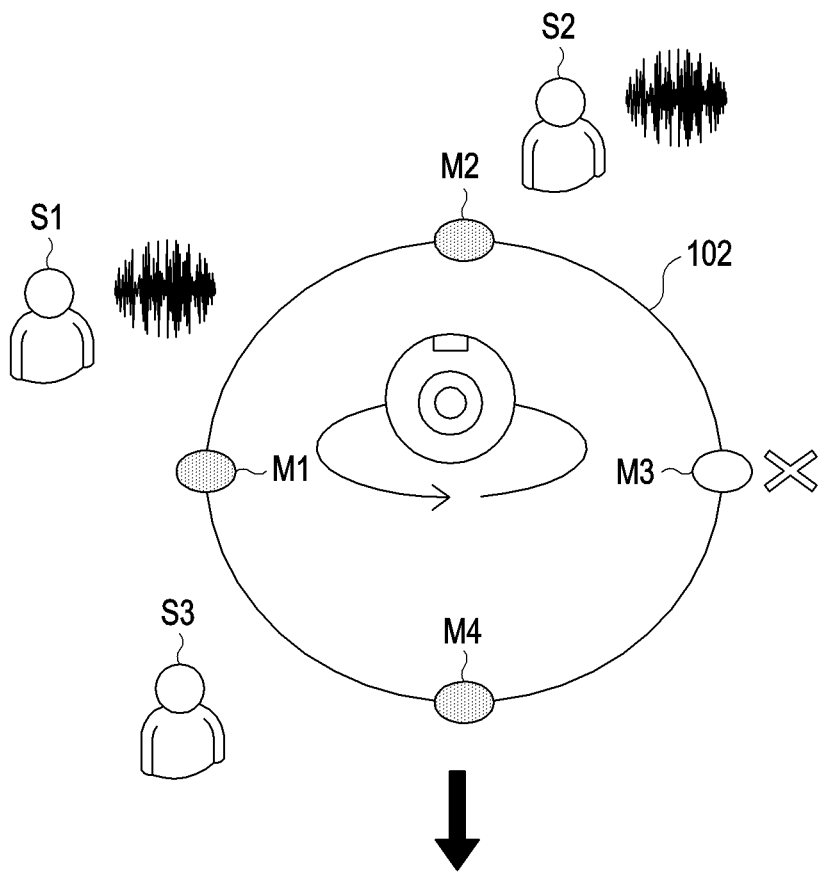
FIG. 14 illustrates an operation for recording a mixed audio signal and reproducing directional audio therefrom, according to an embodiment.
Figure 14:
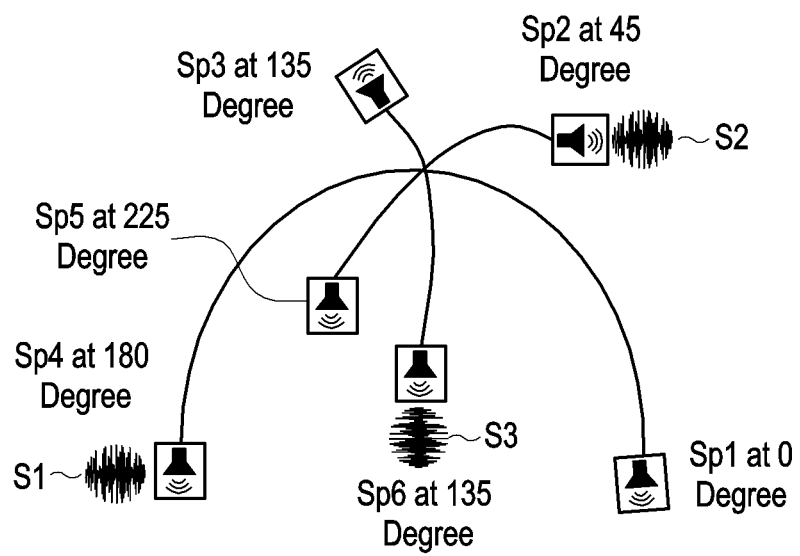

FIG. 14 illustrates an operation for recording mixed audio and reproducing directional audio therefrom, according to an embodiment.

Referring to FIG. 14, an electronic device 102 is a 360-degree view recorder with 4 microphones M1 to M4. The microphones M1 to M4 are arranged in a circular form on the 360-degree view recorder.

The audio sources include three humans S1 to S3. Source S1 can generate audio signal from the right of the electronic device 102, source S2 can generate audio signal from back of the electronic device 102, and source S3 can generate audio signal from front of the electronic device 102.

Upon receiving the mixed audio signal, which is a combination of audio signals generated by sources S1 to S3, an audio recording module of the electronic device 102 determines the direction and the positional information of each of the active audio sources and dynamically selects microphones M1, M2, and M4 (as represented by shading) for recording the mixed audio signal. The mixed audio signal from the remaining microphone M3 (as represented by an X) is not used or deactivated. The direction of S1 is estimated as 170-degrees to the 360-degree view recorder and therefore the microphone M1 is selected for speaker S1. The direction of S2 is estimated as 70-degrees to the 360-degree view recorder and therefore the microphone M2 is selected for source S2. The direction of S3 is estimated as 300-degrees to the 360-degree view recorder and therefore the microphone M3 is selected for source S3. The audio recording module stores the recorded mixed audio signal along with FI and SI as an audio file. The plurality of speakers Sp1 to Sp6 are included in a 360-degree speaker set. The audio file may be played on the plurality of speakers Sp1 to Sp6 arranged or located at various angles. Speaker Sp1 is located at 0-degrees, speaker Sp2 is located at 45-degrees, speaker Sp3 is located at 135-degrees, speaker Sp4 is located at 180-degrees, speaker Sp5 is located at 225-degrees, and speaker Sp6 is located at 315-degrees.

An audio reproducing module performs source separation to obtain the plurality of audio signals from the mixed audio signal based on the FI. The audio reproducing module reproduces the audio signals of different sources from different speakers based on the FI and the SI. Accordingly, the audio reproducing module reproduces the audio signal of source S1 from speaker Sp4 based on the selection of the user, the direction of the audio source, and the direction of the speaker Sp4 since the direction of speaker Sp4 is closest to the direction of the source S1. The audio reproducing module reproduces the audio signal of source S2 from the speaker Sp2 based on the selection of the user, the direction of the audio source, and the direction of the speaker Sp2 since the direction of speaker Sp2 is closest to the direction of the source S2. The audio reproducing module reproduces the audio signal of source S3 from the speaker Sp6 based on the selection of the user, the direction of the audio source, and the direction of the speaker Sp6 since the direction of speaker Sp6 is closest to the direction of the source S3.

Figure 15A:
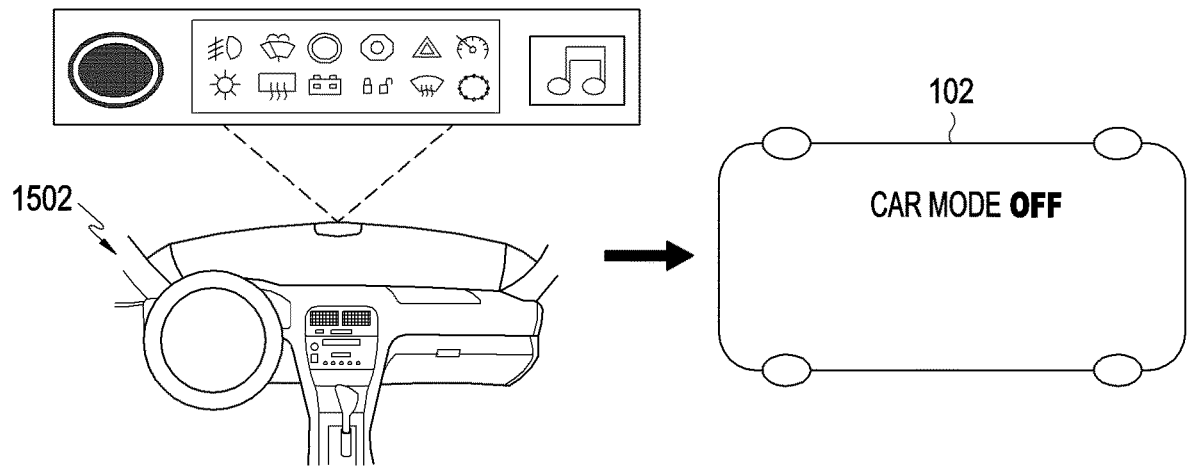
Figure 15B:
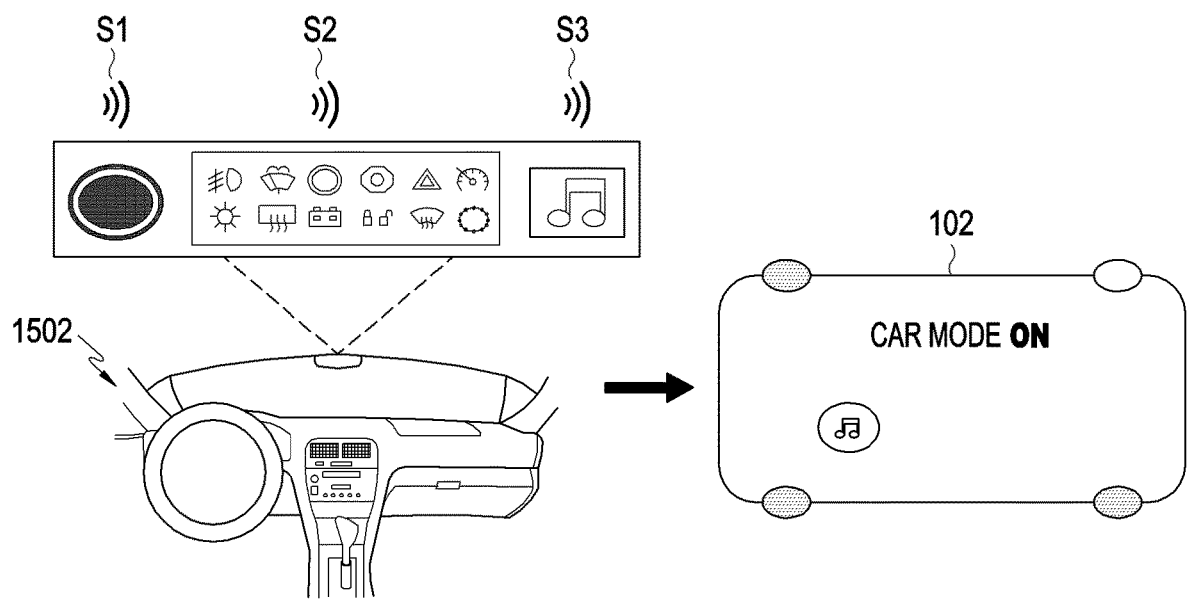

FIGS. 15A and 15B illustrate an operation for recording mixed audio and reproducing directional audio therefrom, according to an embodiment.

In FIGS. 15A and 15B, the electronic device 102 is a smart phone with 4 integrated microphones (represented using circles). The smart phone may be configured to be operated in a car mode or a hands-free mode that allows incoming calls and other new notifications the smart phone to be read out automatically. Typically, the car mode is activated by a user of the smart phone. The smart phone is integrated with one or more of speakers.

Referring to FIG. 15A, the electronic device 102 is present in or connected with a smart vehicle 1502 that can produce various audio signals, such as audio signals produced due to engine start-stop, audio signals produced due to various sensors, audio signals produced due to operating of an air conditioner (AC), audio signals produced due to music played by music player within the car, etc. Initially, the car mode is not activated.

Referring to FIG. 15B, three audio sources S1, S2, and S3, are activated within the vehicle 1502. In this example, source S1 is the engine, source S2 is the AC, and source S3 is music played from the electronic device 102. An audio recording module of the electronic device 102 receives mixed audio signal from the sources S1, S2, and S3. The audio recording module determines the direction of the active audio sources and dynamically selects three (3)

microphones (as represented by shading) for recording the mixed audio signal. The remaining microphone (as represented without any shading) may be used for noise suppression after beamforming and source separation. The audio recording module creates the recorded mixed audio signal along with FI and SI as an audio file.

Based on the audio file, an audio reproducing module of the electronic device 102 performs source separation using blind source separation techniques. The audio reproducing module then performs acoustic scene classification based on the separated audio signals to detect current environment as in-car environment. The audio reproducing module may perform acoustic scene classification based on the separated audio signals using techniques as known in the art. Upon detecting current environment as in-car environment, the audio reproducing module activates the car mode and reproduces audio signal of the source S3 from the speakers.

Figure 16A:
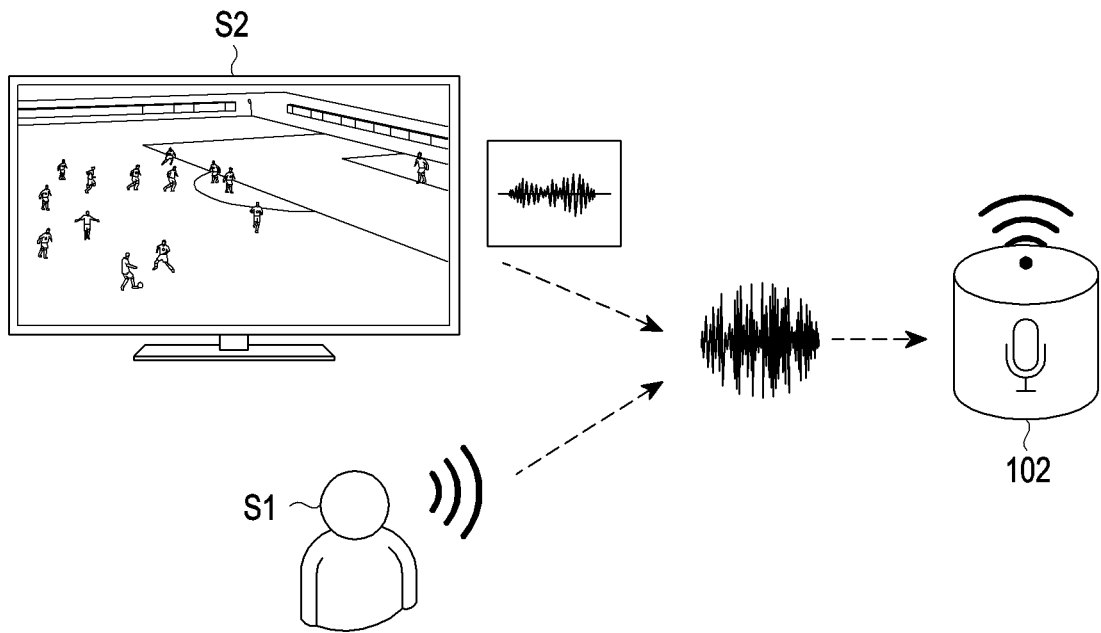
FIGS. 16A and 16B illustrate operations for recording a mixed audio signal and reproducing directional audio therefrom, according to an embodiment.
Figure 16B:
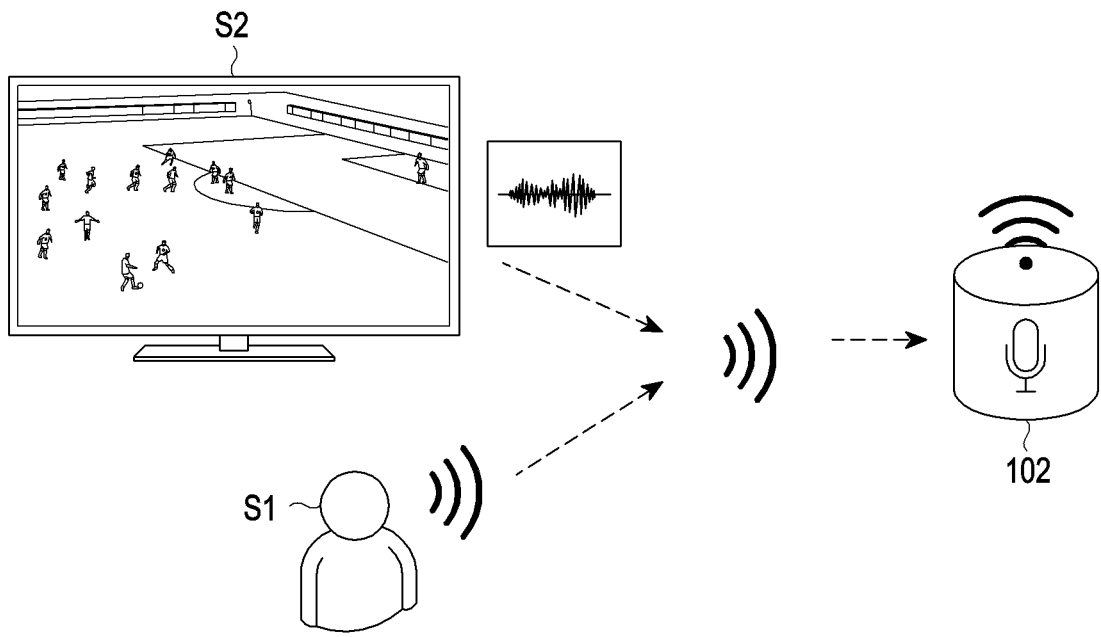

FIGS. 16A and 16B illustrate an operation for recording mixed audio and reproducing directional audio therefrom, according to an embodiment.

In FIGS. 16A and 16B, the electronic device 102 is a voice assistant device with integrated four (4) microphones. A voice assistant device is integrated with one or more of the speakers.

Referring to FIG. 16A, the electronic device 102 receives mixed audio signal from two sources, human source S1 providing a command to the voice assistant device and non-human source S2 such as a television (TV) emanating audio signals at same time. An audio recording module of the electronic device 102 determines the direction of the active audio sources using techniques as described above, such as beamforming. The audio recording module dynamically selects two (2) microphones for recording the mixed audio signal. The remaining microphones are used for noise suppression. The audio recording module stores the recorded mixed audio signal along with FI and SI as an audio file.

Referring to FIG. 16B, based on the audio file, an audio reproducing module of the electronic device 102 performs blind source separation. The audio reproducing module then selects the audio signal of the source S1 for reproduction. The audio reproducing module reproduces the audio from the source S1 from the integrated speaker and performs operation based on the audio signal. The various operations/functions of the audio recording module and the audio reproducing module, such as recording a mixed audio signal, storing of the audio file, and reproduction of the audio signal of selected source from the audio file are performed consecutively, without any delay, such that the human source S1 has a seamless experience.

Figure 17:
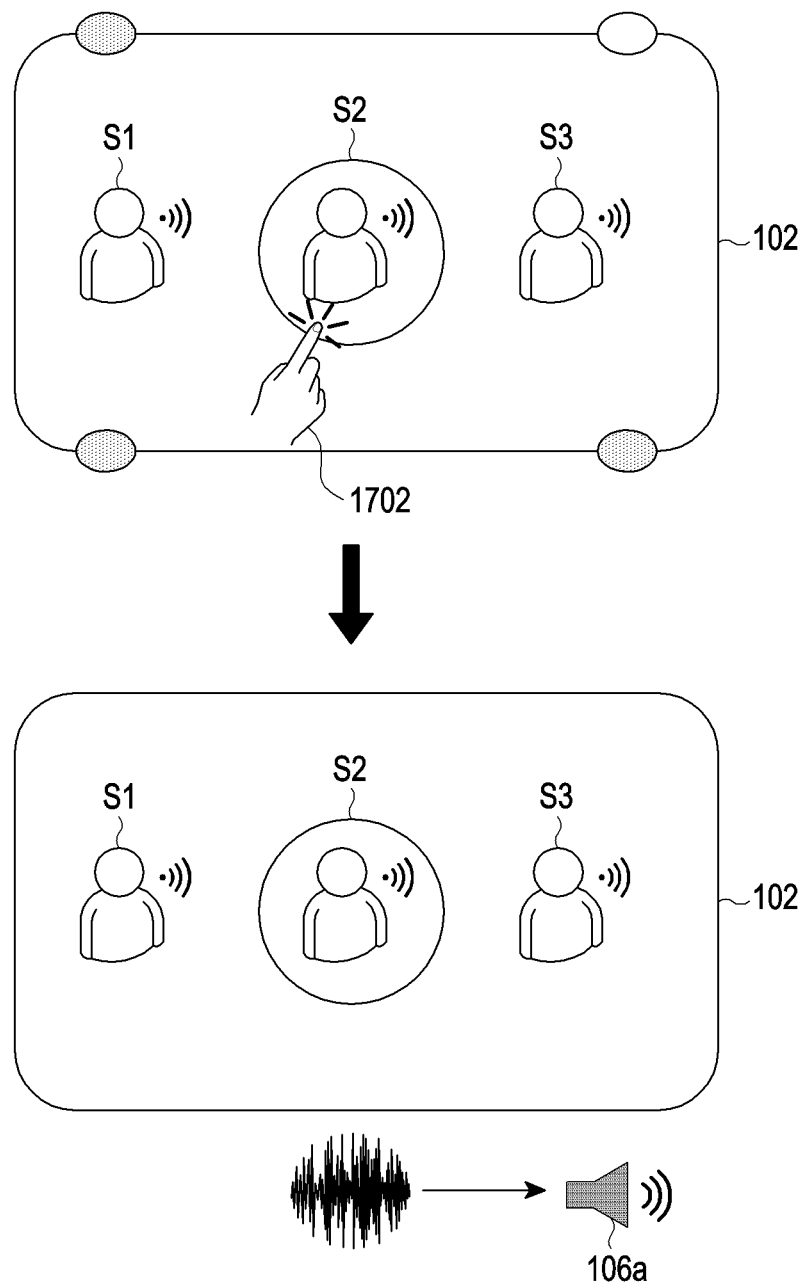
FIG. 17 illustrates an operation for recording a mixed audio signal and reproducing directional audio therefrom, according to an embodiment.

FIG. 17 illustrates an operation for recording mixed audio and reproducing directional audio therefrom, according to an embodiment.

Referring to FIG. 17, the electronic device 102 is a smart phone with four (4) integrated microphones (as represented using circles). The electronic device 102 is also connected with at least one speaker 106a.

A live video recording of three humans, source S1, source S2, and source S3 is made using the electronic device 102. An input receiving module of the electronic device 102 receives a user input 1702 indicating audio zooming for source S2. An audio recording module the electronic device 102 tracks the source S2 using various techniques as described above, such as blind source separation, pitch tracking, beam formation, etc., or combination thereof. The audio recording module determines the direction of the active audio sources and dynamically selects three (3) of the microphones (as represented by shading) for recording the mixed audio signal. The mixed audio signal from the remaining microphone (as represented without any shading) may be used for noise suppression. The audio recording module may also perform gender classification using techniques or standards as known in the art. The audio recording module stores the recorded mixed audio signal along with FI and SI as an audio file.

The electronic device 102 receives a user input to play the audio file via the at least one speaker 106a integrated with the electronic device 102. As such, the audio reproducing module performs source separation in order to obtain the plurality of audio signals from the mixed audio signal based on the FI. Each separated audio signal is single channel or mono-channel audio, i.e., audio from a single source. The audio reproducing module may reproduce the audio signals of different sources from different speakers based on the FI and the SI. The audio reproducing module may reproduce the audio signal from the audio file such that audio signal for the selected source S2 is reproduced via the at least one speaker 106a in enhanced manner while audio signals from other speakers are suppressed.

Figure 18:
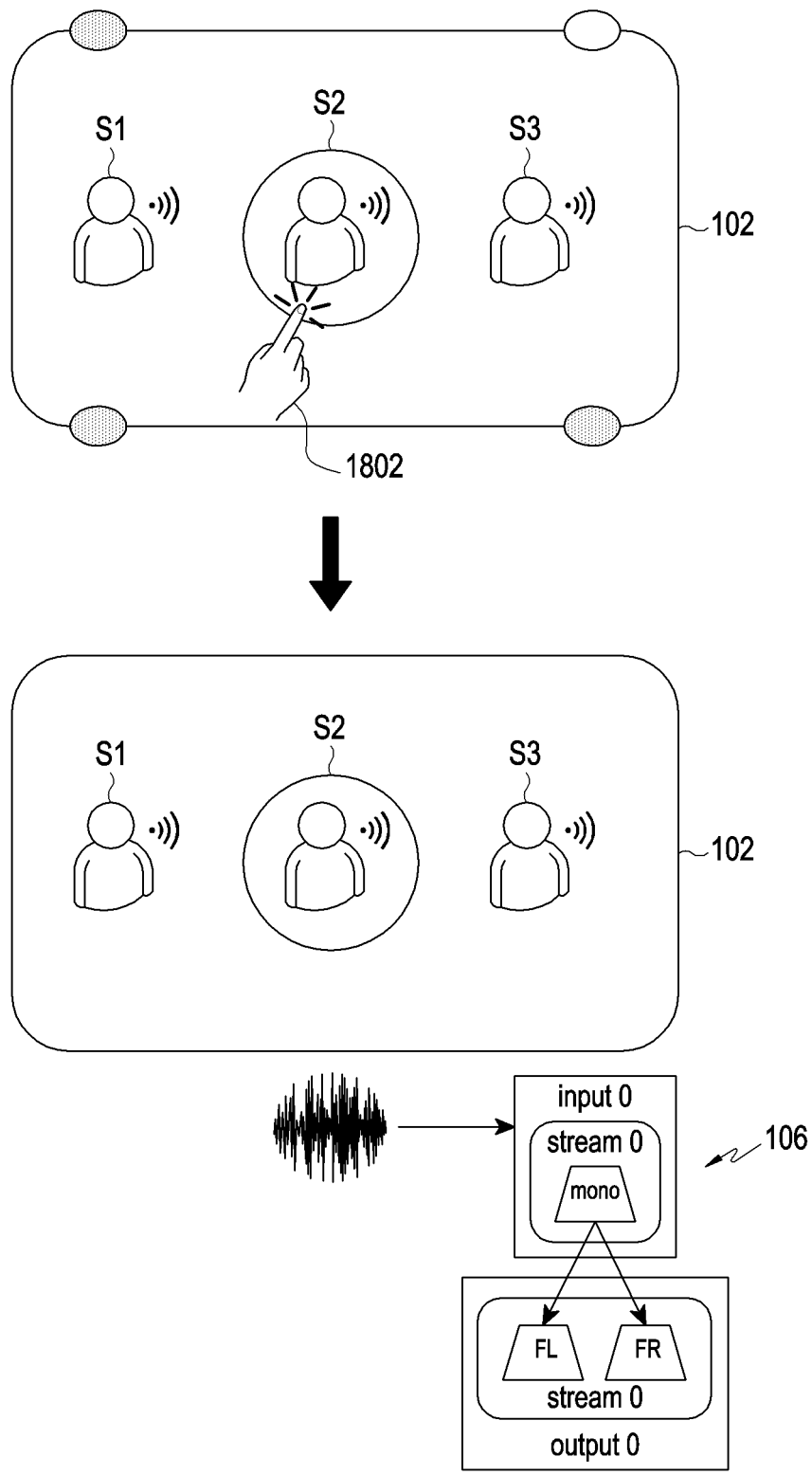
FIG. 18 illustrates an operation for recording a mixed audio signal and reproducing directional audio therefrom, according to an embodiment.

FIG. 18 illustrates an operation for recording mixed audio and reproducing directional audio therefrom, according to an embodiment.

Referring to FIG. 18, the electronic device 102 is a smart phone with 4 integrated microphones (as represented using circles). The electronic device 102 is also connected with two speakers 106.

A live video recording of three humans, source S1, source S2, and source S3 is made using the electronic device 102. An input receiving module of the electronic device 102 receives a user input 1802 that indicates audio zooming for source S2. An audio recording module of the electronic device 102 tracks the source S2 using various techniques as described above. The audio recording module determines the direction of the active audio sources and dynamically selects 3 of the microphones (as represented by shading) for recording the mixed audio signal. The mixed audio signal from the remaining microphone (as represented without any shading) may be used for noise suppression. The audio recording module also performs audio zooming as described above for the selected source S2. The audio recording module may also perform gender classification using techniques or standards as known in the art. The audio recording module may store the recorded mixed audio signal along with FI and SI as an audio file.

The electronic device 102 receives a user input to play the audio file via the speakers 106 in a stereo mode. Based on the audio file, the audio reproducing module performs blind source separation using techniques as known in the art to obtain separate audio signal of the source S2. The separated audio signal is single channel or mono-channel audio. The audio reproducing module then translates the separated audio signal of selected source S2 for two channels, channel 1 (FL) and channel 2 (FR), to obtain two translated audio signals, S2 channel 1 and S2 channel 2. The two channels correspond to two speakers 106, designated as left speaker and right speaker, respectively. The audio reproducing module reproduces the translated audio signals of the selected source S2 from both the speakers 106 while audio signals from other speakers are suppressed.

Figure 19:
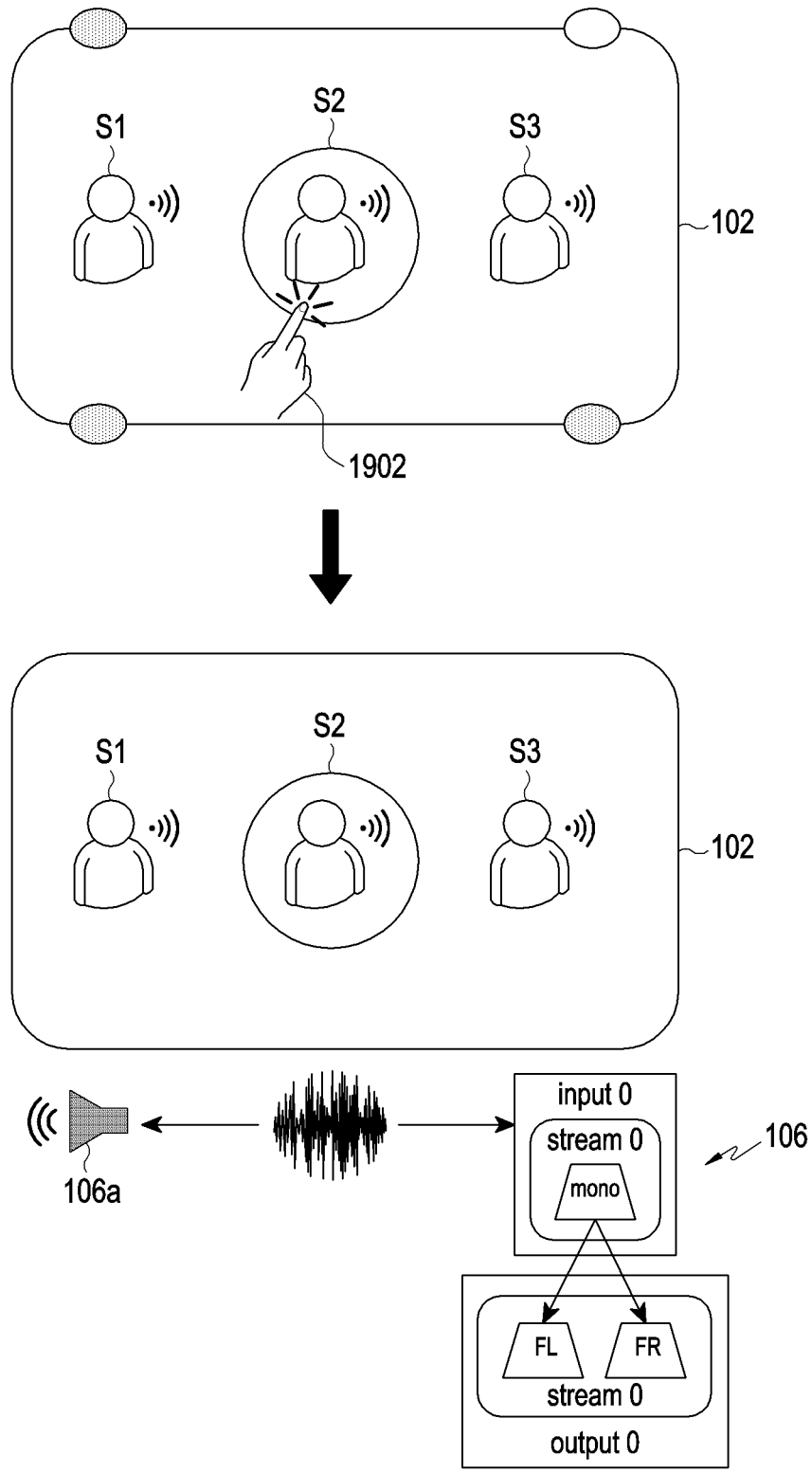
FIG. 19 illustrates an operation for recording a mixed audio signal and reproducing directional audio therefrom, according to an embodiment.

FIG. 19 illustrates an operation for recording mixed audio and reproducing directional audio therefrom, according to an embodiment.

Referring to FIG. 19, the electronic device 102 is a smart phone with 4 integrated microphones (as represented using circles). The electronic device 102 is also connected with at least one speaker 106a and two speakers 106.

A live video recording of three humans, source S1, source S2, and source S3 is made using the electronic device 102. An input receiving module of the electronic device 102 receives a user input 1902 that indicates audio zooming for source S2. An audio recording module of the electronic device 102 tracks sources S1, S2, and S3 using various techniques as described above. The audio recording module determines the direction of the active audio sources and dynamically selects three (3) of the microphones (as represented by shading) for recording the mixed audio signal. The mixed audio signal from the remaining microphone (as represented without any shading) may be used for noise suppression. The audio recording module may also perform audio zooming as described above for the selected source S2. The audio recording module may also perform gender classification using techniques or standards as known in the art. The audio recording module may store the recorded mixed audio signal along with FI and SI as an audio file.

The electronic device 102 receives user input to play the audio file. Based on the audio file, an audio reproducing module of the electronic device 102 performs source separation using techniques as known in the art. The electronic device 102 receives a user input to play the audio signal of source S2 in either of audio zooming mode, mono mode, or stereo mode. Accordingly, the audio reproducing module reproduces the audio signal of the source S2 from the audio file such that audio signal for the selected source S2 is played in normal mode, zoomed mode, mono mode, or stereo mode from the at least one speaker 106a or the two speakers 106 while audio signals from other speakers are suppressed.

Figure 20:
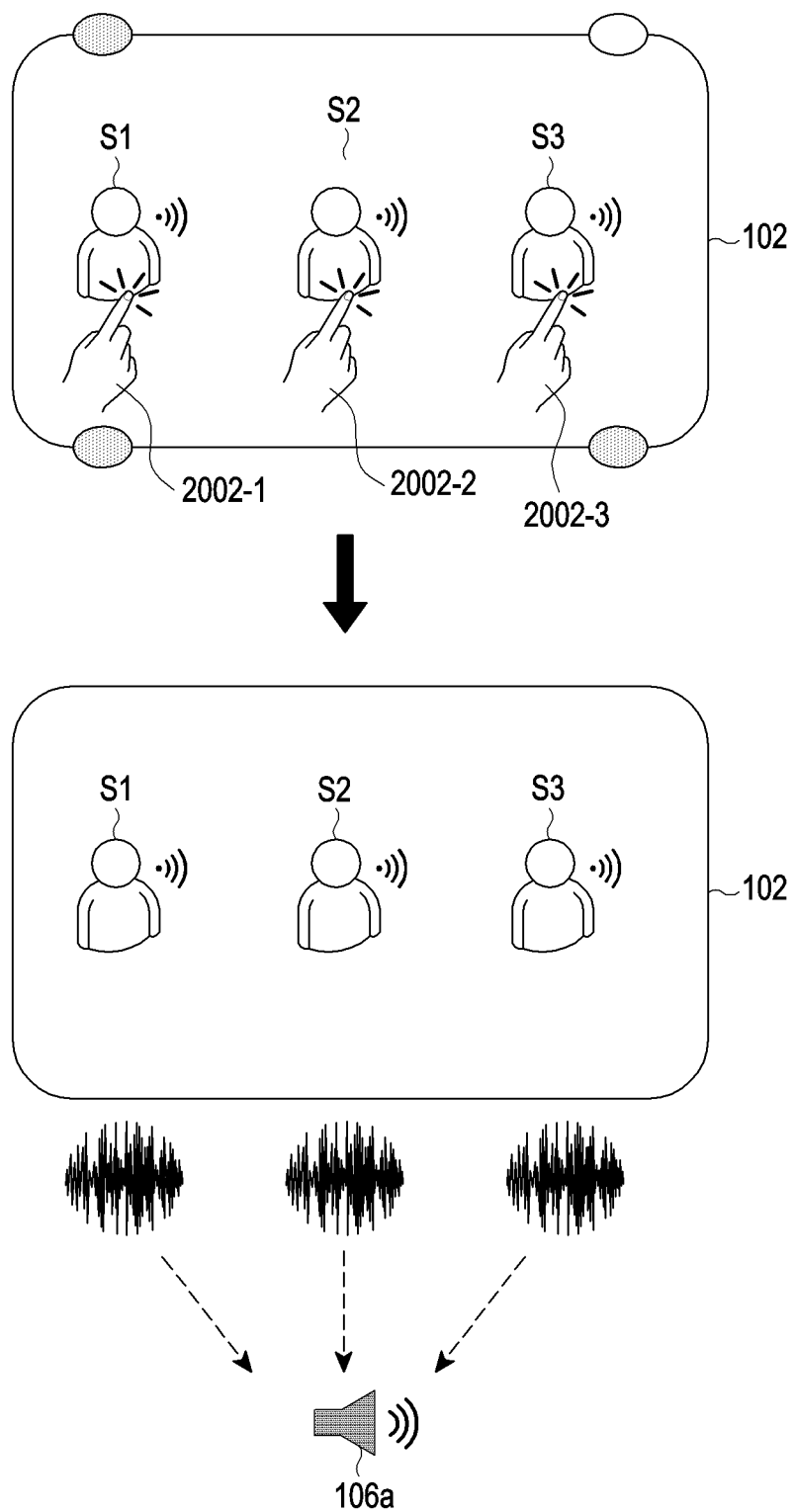
FIG. 20 illustrates an operation for recording a mixed audio signal and reproducing directional audio therefrom, according to an embodiment.

FIG. 20 illustrates an operation for recording mixed audio and reproducing directional audio therefrom, according to an embodiment.

Referring to FIG. 20, the electronic device 102 is a smart phone with 4 integrated microphones (as represented using circles). The electronic device 102 is also connected with at least one speaker 106a.

A live video recording of three humans, source S1, source S2, and source S3 is made using the electronic device 102. An input receiving module 214 of the electronic device 102 receives a user input to tag the different sources with names and genders. As such, a user input 2002-1 is received for tagging source S1, a user input 2002-2 is received for tagging source S2, and a user input 2002-3 is received for tagging source S3. An audio recording module of the electronic device 102 tracks the sources S1, S2, and S3 using various techniques as described above. The audio recording module determines the direction of the active audio sources and dynamically selects three (3) of the microphones (as represented by shading) for recording the mixed audio signal. The mixed audio signal from the remaining microphone (as represented without any shading) may be used for noise suppression. The audio recording module may also perform gender classification using techniques or standards as known in the art. The audio recording module may also store the recorded mixed audio signal along with FI and SI as an audio file.

The electronic device 102 receives a user input to play the audio file. Based on the audio file, an audio reproducing module of the electronic device 102 performs source separation using blind source separation techniques as known in the art. The electronic device 102 receives a user input to play the combined audio signals of all sources, or play audio signal of individual source. Accordingly, the audio reproducing module reproduces the audio signals from the audio file through the at least one speaker 106a.

Figure 21:
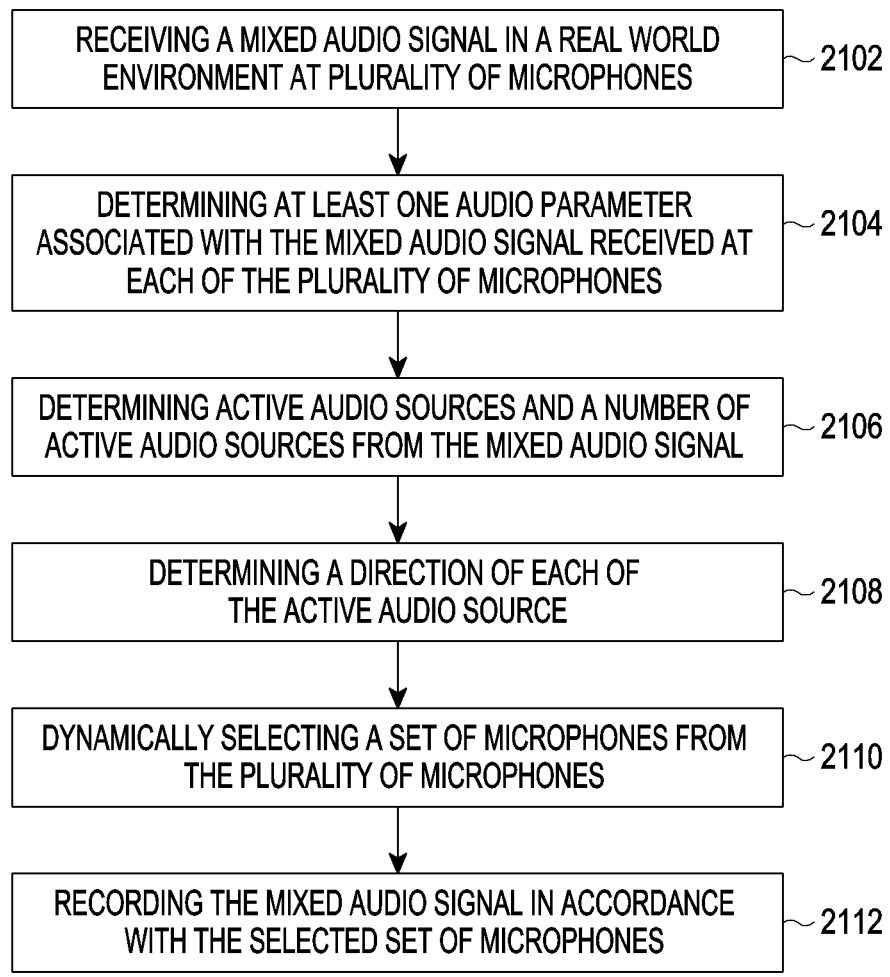
FIG. 21 is a flow diagram illustrating a method for recording a mixed audio signal, according to an embodiment.

FIG. 21 is a flow diagram illustrating a method for recording a mixed audio signal, according to an embodiment. The method of FIG. 21 may be implemented in a multi-microphone device using components thereof, as described above.

Referring to FIG. 21, in step 2102, the device receives a mixed audio signal in a real world environment at plurality of microphones. For example, the signal receiving module 210 receives the mixed audio signal at the plurality of microphones 104-1, 104-2, 104-3, and 104-4.

In step 2104, the device determines at least one audio parameter associated with the mixed audio signal received at each of the plurality of microphones. The at least one audio parameter may include a dominant wavelength, an intensity, an amplitude, a dominant frequency, a pitch, and/or a loudness.

In step 2106, the device determines active audio sources and a number of active audio sources from the mixed audio signal.

In step 2108, the device determines direction and positional information of each of the active audio sources.

In step 2110, the device dynamically selects a set of microphones from the plurality of microphones based on the number of active audio sources, the direction of each of the active audio sources, the positional information of each of the active audio sources, the at least one audio parameter, the at least one audio parameter, and at least one predefined condition. The set of microphones is equal to the number of active audio sources, and the at least one predefined condition is selected based on the number of active audio sources and the at least one audio parameter.

In step 2112, the device records the mixed audio signal in accordance with the selected set of microphones for reproducing directional/separated audio from the recorded mixed audio signal.

The direction of each of the active audio sources may be determined relative to a direction of one of the multi-microphone device and a ground surface. The direction of each of the active audio sources may be determined based on at least one of the at least one audio parameter, magnetometer reading of the multi-microphone device, and/or azimuthal direction of the active audio source.

The method may also include receiving a user input that indicates a selection of each of the active audio sources in media including the mixed audio signal. The method may also include determining the direction of each of the active audio sources based on an analysis of the media.

The method may also include receiving a user input that indicates a selection of the active audio sources in media including the mixed audio signal. The method may include tracking the active audio sources based on at least one of a learned model, the at least one audio parameter, at least one physiological feature of the active audio source, and/or at least one beam formed on the selected active audio source. The method may also include determining the direction of the tracked active audio source based on the learned model.

The at least one predefined condition may include:

a. selecting a first microphone and a second microphone from the plurality of microphones such that a distance between the first microphone and a second microphone is substantially equal to half of the dominant wavelength of the mixed audio signal;

b. selecting a third microphone from the plurality of microphones such that intensity associated with the mixed audio signal received at the third microphone is maximum, and wherein the third microphone is different from the first microphone and the second microphone;

c. selecting a fourth microphone from the plurality of microphones such that intensity associated with the mixed audio signal received at the second microphone is minimum, wherein the fourth microphone is different from the first microphone, the second microphone, and the third microphone; and d. selecting a set of microphones from a plurality of sets of microphones based on an analysis parameter derived for each of the plurality of sets of microphones, wherein the plurality of microphones are grouped into the plurality of sets of microphones based on the number of active audio sources.

Each of the plurality of sets of microphones includes at least two of the first microphone, the second microphone, the third microphone, and the fourth microphone.

While selecting a set of microphones from a plurality of sets of microphones, the method may further include grouping microphones in each of the plurality of sets of microphones in a predefined order based on intensities of each of the microphones, deriving the analysis parameter for each of the plurality of sets of microphones as one of difference of adjacent intensities in each of the plurality of sets of microphones and/or product of the difference of adjacent intensities in each of the plurality of sets of microphones, and selecting the set of microphones such that the analysis parameter derived for the set of microphones is maximum among the analysis parameter derived for each of the plurality of sets of microphones.

The method may further include detecting a change in the real world environment periodically. The change in the real world environment is indicative of at least one of a change in the number of active audio sources; a movement of at least one of the active audio sources; a change in at least one audio parameter associated with the mixed audio signal; a change in an orientation of at least one of the plurality of microphones; a change in position of the at least one of the plurality of microphones; and a change in position of the multi-microphone device. The method may further include dynamically selecting a set of further microphones from the plurality of microphones based on the detected change.

The method may also include storing the recorded mixed audio signal in conjunction with FI and SI. To this end, the method may also include defining binaural axis for one of the plurality of microphones and the electronic device. The FI includes one or more of the active audio sources, a number of the active audio sources, a direction of each of the active audio sources, and/or positional information of each of the active audio sources. The SI includes one or more of position of the selected set of microphones, position of a plurality of microphones, position of the selected set of microphones relative to the plurality of microphones, position of the selected set of microphones relative to an electronic device communicatively coupled to the plurality of microphones, and/or position of the selected set of microphones relative to a ground surface.

The method may further include transmitting the audio file (or a media including the audio file) to another electronic device that reproduces directional audio using the audio file.

Figure 22:
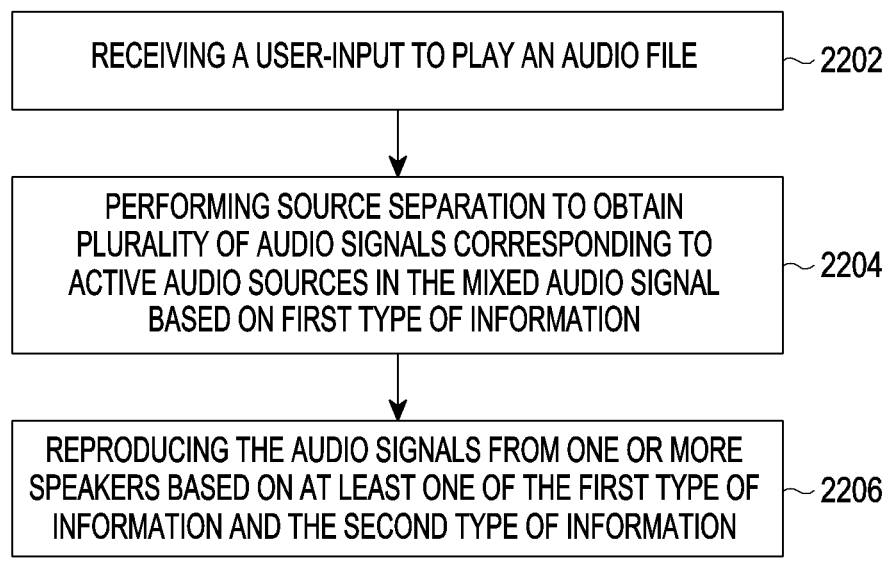
FIG. 22 is a flow diagram illustrating a method for reproducing directional audio from a recorded mixed audio signal, according to an embodiment.

FIG. 22 is a flow diagram illustrating a method for reproducing directional audio, according to an embodiment. The method may be implemented in the multi-microphone device using components thereof, as described above.

Referring to FIG. 22, in step 2202, the device receives a user input to play an audio file. The audio file includes a mixed audio signal recorded at a multi-micro-phone device in conjunction with FI and a SI.

In step 2204, the device performs source separation to obtain a plurality of audio signals corresponding to active audio sources in the mixed audio signal based on the FI.

In step 2206, the device reproduces the audio signal from one or more speakers based on at least one of the FI and/or the SI.

Further, the FI includes one or more of the active audio sources, a number of the active audio sources, a direction of each of the active audio sources, and/or positional information of each of the active audio sources. The SI includes one or more of position of the selected set of microphones, position of a plurality of microphones, position of the selected set of microphones relative to the plurality of microphones, position of the selected set of microphones relative to an electronic device communicatively coupled to the plurality of microphones, and/or position of the selected set of microphones relative to a ground surface.

The method may also include receiving a user input to select one or more of the active audio sources in the mixed audio file. The method may also include determining a number of one or more speakers based on one of a user input and a predefined criterion. The method may also include performing a translation of each of the plurality of audio signals to obtain translated audio signals based on the FI, a sample delay, and the number of the one or more speakers. The method includes reproducing the translated audio signals from the one or more speakers based on the number of one or more speakers and at least one of the FI and/or the SI.

The method may further include receiving the mixed audio file (or a media including the mixed audio file) from another electronic device that records the mixed audio file.

As described above, the disclosure allows dynamic selection of microphones equal to number of active audio sources in the real world environment, which is optimum for over-determined case. A method according to an embodiment operates in the time domain and frequency domain, and therefore is faster. Further, this method takes into account the different distribution of microphones and chooses the microphones where the dimensionally separated microphones enhance separation. The method also considers other aspects like a maximum separation between microphones and audio parameters of audio signals to select the microphone, thereby leading to superior audio separation in reduced time. The method also considers movement of the audio sources, movement of the electronic device, and audio sources being active periodically or non-periodically. Further, the efficiency of the electronic device in terms of power, time, memory, system response, etc., is improved greatly.

The advantages of the present disclosure include, but are not limited to, changing an over-determined case to a perfectly determined case by allowing dynamic selection of microphones equal to number of active audio sources to record the mixed audio signal based on various parameters including direction and positional information of the active audio sources, maximum separation between microphones, and audio parameters of the mixed audio signal. As such, the recording of the mixed audio signal is optimized for an over-determined case. This further leads to superior audio separation. Further, different distributions of microphones are considered and the microphones are selected where the dimensionally separated microphones enhance source separation. Further, such recording enables reproducing directional audio in an optimal manner, thereby leading to enhanced user experience.

While specific language has been used to describe the disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. Clearly, the present disclosure may be otherwise variously embodied, and practiced within the scope of the following claims.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method for recording a mixed audio signal, the method comprising:
    receiving a mixed audio signal via plurality of microphones;
    determining an audio parameter associated with the mixed audio signal received at each of the plurality of microphones;
    determining active audio sources and a number of the active audio sources from the mixed audio signal;
    determining direction and positional information of each of the active audio source;
    dynamically selecting a set of microphones from the plurality of microphones based on the number of the active audio sources, the direction of each of the active audio sources, the positional information of each of the active audio sources, the audio parameter, and a predefined condition; and
    recording, based on the selected set of microphones, the mixed audio signal for reproducing directional audio,
    wherein the predefined condition includes at least one of:
        selecting a first microphone and a second microphone from the plurality of microphones such that a distance between the first microphone and the second microphone is substantially equal to half of a dominant wavelength of the mixed audio signal;
        selecting a third microphone from the plurality of microphones such that an intensity associated with the mixed audio signal received at the third microphone is at a maximum, wherein the third microphone is different from the first microphone and the second microphone;
        selecting a fourth microphone from the plurality of microphones such that an intensity associated with the mixed audio signal received at the second microphone is at a minimum, wherein the fourth microphone is different from the first microphone, the second microphone, and the third microphone; or
        selecting a set of microphones from a plurality of sets of microphones based on an analysis parameter derived for each of the plurality of sets of microphones, wherein the plurality of microphones are grouped into the plurality of sets of microphones based on the number of the active audio sources.

2. The method as claimed in claim 1, wherein a number of microphones in the set of microphones is equal to the number of the active audio sources, and wherein the predefined condition is identified based on the number of the active audio sources and the audio parameter.

3. The method as claimed in claim 1, wherein the direction of each of the active audio sources is determined relative to a direction of one of:
    the plurality of microphones,
    an electronic device communicatively coupled to the plurality of microphones, or
    a ground surface.

4. The method as claimed in claim 1, wherein determining the direction of each of the active audio sources is based on at least one of the audio parameter, a magnetometer reading of an electronic device communicatively coupled to the plurality of microphones, or an azimuthal direction of the active audio source.

5. The method as claimed in claim 1, wherein determining the direction of each of the active audio sources comprises:
    receiving a user input selecting each of the active audio sources in media including the mixed audio signal;
    identifying the active audio sources in response to the user input; and
    determining the direction of the identified active audio sources based on an analysis of the media.

6. The method as claimed in claim 1, wherein determining the direction of each of the active audio sources comprises:
    receiving a user input that selects the active audio sources in media including the mixed audio signal;
    tracking the active audio sources based on at least one of a learned model, the audio parameter, a physiological feature of the active audio source, or a beam formed towards the active audio source; and
    determining the direction of the tracked active audio source based on the learned model.

7. The method as claimed in claim 1, wherein the audio parameter includes at least one of a dominant wavelength, an intensity, an amplitude, a dominant frequency, a pitch, or a loudness.

8. The method as claimed claim 1, wherein each of the plurality of sets of microphones includes at least two of the first microphone, the second microphone, the third microphone, and the fourth microphone.

9. The method as claimed in claim 1, wherein selecting the set of microphones from the plurality of sets of microphones comprises:
    grouping microphones in each of the plurality of sets of microphones in a predefined order based on an intensity of each of the microphones;
    deriving the analysis parameter for each of the plurality of sets of microphones as one of a difference of adjacent intensities in each of the plurality of sets of microphones or a product of the differences of adjacent intensities in each of the plurality of sets of microphones; and
    selecting the set of microphones such that the analysis parameter derived for the set of microphones is at a maximum among the analysis parameter derived for each of the plurality of sets of microphones.

10. The method as claimed in claim 1, further comprises:
    periodically detecting a change in an environment; and
    dynamically selecting a new set of microphones from the plurality of microphones based on the detected change.

11. The method as claimed in claim 10, wherein the change in the environment indicates at least one of:
    a change in the number of the active audio sources;
    a movement of at least one of the active audio sources;

a change in an audio parameter associated with the mixed audio signal;

a change in an orientation of at least one of the plurality of microphones;

a change in position of the at least one of the plurality of microphones; or a change in position of an electronic device communicatively coupled to the plurality of microphones.

12. The method as claimed in claim 1, further comprises storing the recorded mixed audio signal in conjunction with a first type of information pertaining to the mixed audio signal and a second type of information pertaining to the selected set of microphones as an audio file.

13. An electronic device for recording mixed audio signal, the electronic device comprising:

a memory; and a processor configured to:

receive a mixed audio signal via a plurality of microphones, determine an audio parameter associated with the mixed audio signal received at each of the plurality of microphones, determine active audio sources and a number of the active audio sources from the mixed audio signal, determine direction and positional information of each of the active audio source, dynamically select a set of microphones from the plurality of microphones based on the number of the active audio sources, the direction of each of the active audio sources, the positional information of each of the active audio sources, the audio parameter and a predefined condition, and record, based on the selected set of microphones, the mixed audio signal for reproducing directional audio, wherein the predefined condition includes at least one of:

selecting a first microphone and a second microphone from the plurality of microphones such that a distance between the first microphone and the second microphone is substantially equal to half of a dominant wavelength of the mixed audio signal;

selecting a third microphone from the plurality of microphones such that an intensity associated with the mixed audio signal received at the third microphone is at a maximum, wherein the third microphone is different from the first microphone and the second microphone;

selecting a fourth microphone from the plurality of microphones such that an intensity associated with the mixed audio signal received at the second microphone is at a minimum, wherein the fourth microphone is different from the first microphone, the second microphone, and the third microphone; or selecting a set of microphones from a plurality of sets of microphones based on an analysis parameter derived for each of the plurality of sets of microphones, wherein the plurality of microphones are grouped into the plurality of sets of microphones based on the number of the active audio sources.

14. The electronic device as claimed in claim 13, wherein the set of microphones is equal to the number of the active audio sources, and wherein the predefined condition is selected based on the number of the active audio sources and the audio parameter.

15. The electronic device as claimed in claim 13, wherein the direction of each of the active audio sources is determined relative to a direction of one of:

the plurality of microphones, an electronic device communicatively coupled to the plurality of microphones, or a ground surface.

16. The electronic device as claimed in claim 13, wherein the direction of each of the active audio sources is determined based on at least one of the audio parameter, a magnetometer reading of an electronic device communicatively coupled to the plurality of microphones, or an azimuthal direction of the active audio source.

* * * * *